US009487308B2

(12) United States Patent
Featherstone et al.

(10) Patent No.: US 9,487,308 B2
(45) Date of Patent: Nov. 8, 2016

(54) LAUNCH VEHICLES WITH RING-SHAPED EXTERNAL ELEMENTS, AND ASSOCIATED SYSTEMS AND METHODS

(71) Applicants: Mark Featherstone, Issaquah, WA (US); John Michael Sanders, Sammamish, WA (US); Roger E. Ramsey, Renton, WA (US); Eric David Wetzel, Seattle, WA (US)

(72) Inventors: Mark Featherstone, Issaquah, WA (US); John Michael Sanders, Sammamish, WA (US); Roger E. Ramsey, Renton, WA (US); Eric David Wetzel, Seattle, WA (US)

(73) Assignee: Blue Origin, LLC, Kent, WA (US)

( * ) Notice: Subject to any disclaimer, the term of this patent is extended or adjusted under 35 U.S.C. 154(b) by 464 days.

(21) Appl. No.: 13/833,985

(22) Filed: Mar. 15, 2013

(65) Prior Publication Data

US 2014/0263841 A1  Sep. 18, 2014

(51) Int. Cl.
*B64G 1/00* (2006.01)
*B64G 1/14* (2006.01)
(Continued)

(52) U.S. Cl.
CPC .............. *B64G 1/002* (2013.01); *B64G 1/14* (2013.01); *B64G 1/222* (2013.01); *B64G 1/402* (2013.01); *B64G 1/62* (2013.01); *F42B 10/02* (2013.01);
(Continued)

(58) Field of Classification Search
CPC . B64C 2201/18; B64C 39/06; B64C 39/062; B64G 1/00; B64G 1/002; B64G 1/62; B64G 1/641; B64G 1/645
See application file for complete search history.

(56) References Cited

U.S. PATENT DOCUMENTS

| 2,464,827 A | 3/1949 | Noyes et al. |
| 2,824,711 A * | 2/1958 | Porter ............ G01M 9/00 244/3.21 |

(Continued)

FOREIGN PATENT DOCUMENTS

| RU | 2088787 | 8/1997 | |
| WO | WO 2010099228 A1 * | 9/2010 | ............ B65G 1/002 |

(Continued)

OTHER PUBLICATIONS

Bill Gunston; The Cambridge Aerospace Dictionary; 2009; Cambridge University Press.*

(Continued)

*Primary Examiner* — Tien Dinh
*Assistant Examiner* — Michael A Fabula
(74) *Attorney, Agent, or Firm* — Perkins Coie LLP

(57) ABSTRACT

Launch vehicles with ring-shaped external elements, and associated systems and methods. A representative aerospace system includes a launch vehicle having a first end and a second end generally opposite the first end, with the launch vehicle being elongated along a vehicle axis extending between the first and second ends, and having an external, outwardly facing surface. The system can further include an annular element carried by the launch vehicle, the annular element having an external, inwardly-facing surface radially spaced apart from, and extending at least partially circumferentially around, the vehicle axis. The annular element can have a first edge surface facing a first direction along the vehicle axis, and a second edge surface facing a second direction along the vehicle axis, the second direction being opposite the first direction. A propulsion system can be carried by the launch vehicle, and can have at least one nozzle positioned toward the first end of the vehicle to launch the vehicle. A controller can be in communication with the launch vehicle and programmed to direct the vehicle in the first direction during vehicle ascent, and in the second direction during vehicle descent.

43 Claims, 16 Drawing Sheets

(51) Int. Cl.
  *F42B 10/02* (2006.01)
  *F42B 10/64* (2006.01)
  *B64G 1/22* (2006.01)
  *B64G 1/62* (2006.01)
  *B64G 1/64* (2006.01)
  *B64G 1/40* (2006.01)
  *B64G 1/12* (2006.01)

(52) U.S. Cl.
  CPC .............. *F42B 10/64* (2013.01); *B64G 1/12* (2013.01); *B64G 1/40* (2013.01); *B64G 1/645* (2013.01)

(56) References Cited

U.S. PATENT DOCUMENTS

| | | | |
|---|---|---|---|
| 2,835,199 A * | 5/1958 | Stanly | F42B 10/06 244/3.25 |
| 2,846,164 A * | 8/1958 | Erich Haberkorn | B64C 29/02 239/265.39 |
| 2,923,495 A * | 2/1960 | Von Zborowski | B64C 39/062 102/378 |
| 2,959,376 A * | 11/1960 | Saurma | B64C 27/20 244/158.9 |
| 2,971,724 A * | 2/1961 | Von Zborowski | B64C 29/02 244/12.1 |
| 3,000,593 A * | 9/1961 | Haberkorn | B64C 29/02 244/2 |
| 3,065,937 A * | 11/1962 | Vigil | B64G 1/62 244/1 R |
| 3,118,636 A | 1/1964 | Kantrowitz et al. | |
| 3,125,313 A * | 3/1964 | Soderberg | B64G 1/62 244/1 R |
| 3,176,464 A * | 4/1965 | Meyer | F02K 9/72 60/233 |
| 3,188,957 A * | 6/1965 | Petre | F42B 10/14 102/384 |
| 3,198,459 A * | 8/1965 | Geary | B64F 1/04 244/12.1 |
| 3,215,372 A * | 11/1965 | Price | B64G 1/14 102/377 |
| 3,231,219 A * | 1/1966 | Young | B64G 1/58 244/1 R |
| 3,252,673 A * | 5/1966 | Reichert | B64C 29/02 244/1 N |
| 3,279,188 A * | 10/1966 | Price | B64G 1/002 42/39.5 |
| 3,285,175 A * | 11/1966 | Keenan | B64C 5/00 102/377 |
| 3,302,908 A * | 2/1967 | Lazareff | B64C 29/0091 244/115 |
| 3,350,887 A * | 11/1967 | Leunig | F02K 9/425 149/36 |
| 3,403,873 A * | 10/1968 | Bell | F41G 7/30 244/3.21 |
| 3,508,724 A * | 4/1970 | Scher | B64G 1/62 244/1 R |
| 3,534,686 A * | 10/1970 | Watson | B64G 1/641 102/378 |
| 3,603,533 A * | 9/1971 | Stripling | F42B 10/64 244/3.23 |
| 3,711,040 A | 1/1973 | Carver | |
| 3,768,255 A * | 10/1973 | Barnes, Jr. | F02K 7/18 60/245 |
| 3,806,064 A * | 4/1974 | Parilla | F02K 9/80 244/169 |
| 4,441,312 A * | 4/1984 | Smith | F02K 9/346 60/245 |
| 4,500,052 A * | 2/1985 | Kim | F02K 3/08 244/12.1 |
| 4,832,288 A * | 5/1989 | Kendall | F42B 10/50 244/113 |
| 4,896,847 A * | 1/1990 | Gertsch | B64G 1/62 244/159.1 |
| 5,086,993 A * | 2/1992 | Wainfan | B64C 3/385 244/34 A |
| 5,295,643 A * | 3/1994 | Ebbert | B64C 29/02 244/12.2 |
| 5,318,255 A * | 6/1994 | Facciano | F42B 15/36 102/378 |
| 5,417,393 A * | 5/1995 | Klestadt | F42B 15/105 244/3.21 |
| 5,526,999 A * | 6/1996 | Meston | B64C 29/0058 244/1 N |
| 5,568,901 A | 10/1996 | Stiennon | |
| 5,595,358 A * | 1/1997 | Demidov | B64C 29/02 244/12.2 |
| 5,667,167 A * | 9/1997 | Kistler | B64G 1/002 244/110 E |
| 5,871,173 A * | 2/1999 | Frank | F41J 9/10 244/1 TD |
| 5,873,549 A * | 2/1999 | Lane | B64G 1/24 102/384 |
| 5,927,653 A * | 7/1999 | Mueller | B64G 1/14 244/138 R |
| 5,932,830 A | 8/1999 | Kristensen et al. | |
| 6,024,006 A | 2/2000 | Kindem et al. | |
| 6,076,771 A * | 6/2000 | Bailey | B64G 1/26 244/158.9 |
| 6,158,693 A * | 12/2000 | Mueller | B64D 17/78 244/158.9 |
| 6,193,187 B1 | 2/2001 | Scott et al. | |
| 6,247,666 B1 | 6/2001 | Baker et al. | |
| 6,450,452 B1 | 9/2002 | Spencer et al. | |
| 6,454,216 B1 | 9/2002 | Kiselev et al. | |
| 6,666,402 B2 * | 12/2003 | Rupert | F42B 10/50 244/3.1 |
| 6,926,576 B1 | 8/2005 | Alway et al. | |
| 6,929,576 B2 | 8/2005 | Armstrong et al. | |
| 7,226,017 B2 * | 6/2007 | Blevio, Sr. | B64C 25/32 244/1 R |
| 7,344,111 B2 | 3/2008 | Janeke | |
| 8,408,497 B2 | 4/2013 | Boelitz et al. | |
| 8,424,808 B2 * | 4/2013 | Boelitz | B64G 1/002 244/158.9 |
| 8,678,321 B2 * | 3/2014 | Bezos | B64G 1/002 114/261 |
| 8,733,706 B1 * | 5/2014 | Fernandez | B64G 1/222 244/139 |
| 8,894,016 B2 | 11/2014 | Featherstone | |
| 2002/0096041 A1* | 7/2002 | Briggs | F41F 3/0413 89/1.817 |
| 2002/0179776 A1* | 12/2002 | Mueller | B64G 1/007 244/158.5 |
| 2006/0006289 A1 | 1/2006 | Janeke | |
| 2006/0038061 A1* | 2/2006 | Blevio | B64C 25/32 244/23 A |
| 2006/0113425 A1 | 6/2006 | Rader | |
| 2008/0078884 A1* | 4/2008 | Trabandt | B64G 1/62 244/171.7 |
| 2009/0108137 A1* | 4/2009 | Simon | B64G 1/002 244/171.3 |
| 2009/0205311 A1* | 8/2009 | Bulman | F02K 7/10 60/219 |
| 2009/0206204 A1* | 8/2009 | Rosen | B64G 1/16 244/158.5 |
| 2010/0320329 A1* | 12/2010 | Boelitz | B64G 1/002 244/158.9 |
| 2010/0327107 A1* | 12/2010 | Featherstone | B64G 1/002 244/3.24 |
| 2011/0017872 A1* | 1/2011 | Bezos | B64G 1/002 244/158.9 |
| 2011/0024558 A1* | 2/2011 | Blevio, Sr. | B64C 25/32 244/103 R |
| 2011/0114792 A1* | 5/2011 | Im | B64G 9/00 244/158.1 |
| 2011/0127382 A1* | 6/2011 | Im | B64G 1/002 244/158.1 |

(56) References Cited

U.S. PATENT DOCUMENTS

2015/0034770 A1* 2/2015 Vandervort .............. B64G 1/52
244/172.1
2016/0023782 A1 1/2016 Featherstone

FOREIGN PATENT DOCUMENTS

WO   WO 2010141111 A2 * 12/2010   ............. B65G 1/002
WO   WO 2010141124 A1 * 12/2010   ............. B65G 1/002

OTHER PUBLICATIONS

Gaubatz et al., "DC-X Results and the Next Step," AIAA Space Programs and Technologies Conference and Exhibit, Sep. 27-29, 1994, 15 pages.

Ishijima et al., "Re-entry and Terminal Guidance for Vertical-Landing TSTO (Two-Stage to Orbit)," A Collection of Technical Papers Part 1, AIAA Guidance, Navigation and Control Conference and Exhibit, Aug. 10-12, 1998, 9 pages.

Kaplan H. Marshall, "Space Shuttle: America's Wing to the Future," 1978, 28 pages.

Memi, E., "A Step to the Moon: DC-X Experimental Lander Set Up Boeing for Future NASA Work," Boeing Frontiers, http://www.boeing.com/news/frontiers/archive/2008/aug/i_history.pdf, accessed Aug. 2008, 2 pages.

NASA, "Space Shuttle Program: Spanning 30 years of; Discovery," http://www.nasa.gov/mission_pages/shuttle, accessed Aug. 13, 2014, 2 pages.

Steven J. Isakowitz, Joseph P. Hopkins, Joshua B. Hopkins, "International Reference Guide to Space Launch Systems," AIAA 4th Edition, 2004, 25 pages.

Waters et al., "Test Results of an F/A-18 Automatic Carrier Landing Using Shipboard Relatives GPS," ION 57th Biennial Guidance Test Symposium, Jun. 11-13, 2001, 11 pages.

M. Avilov. "Types Rockets Models (design and flight)," M.: Publishing house "DOSAAF", 1968. 2 pages.

Pavlushenko et al., "Unmanned Aerial Vehicles History, Use, Distribution, Threats and Prospects of Development," National and Global Security: academic notes of the PIR-center. 2004. No. 2(26), 5 pages.

* cited by examiner

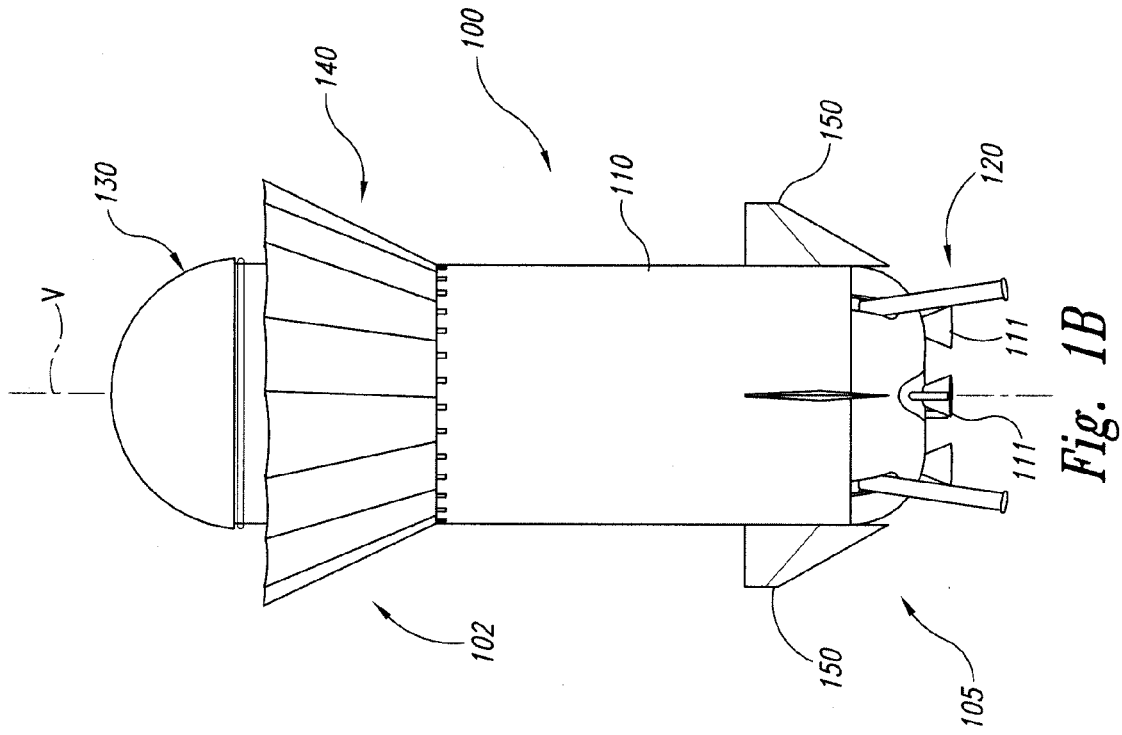
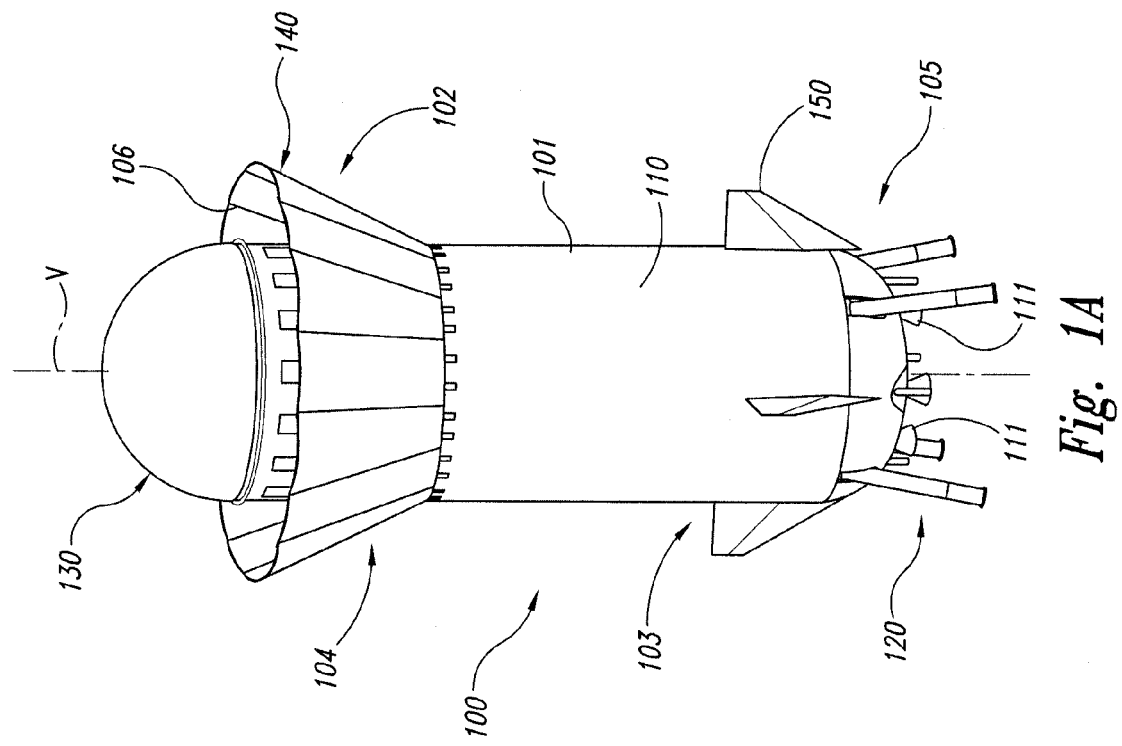

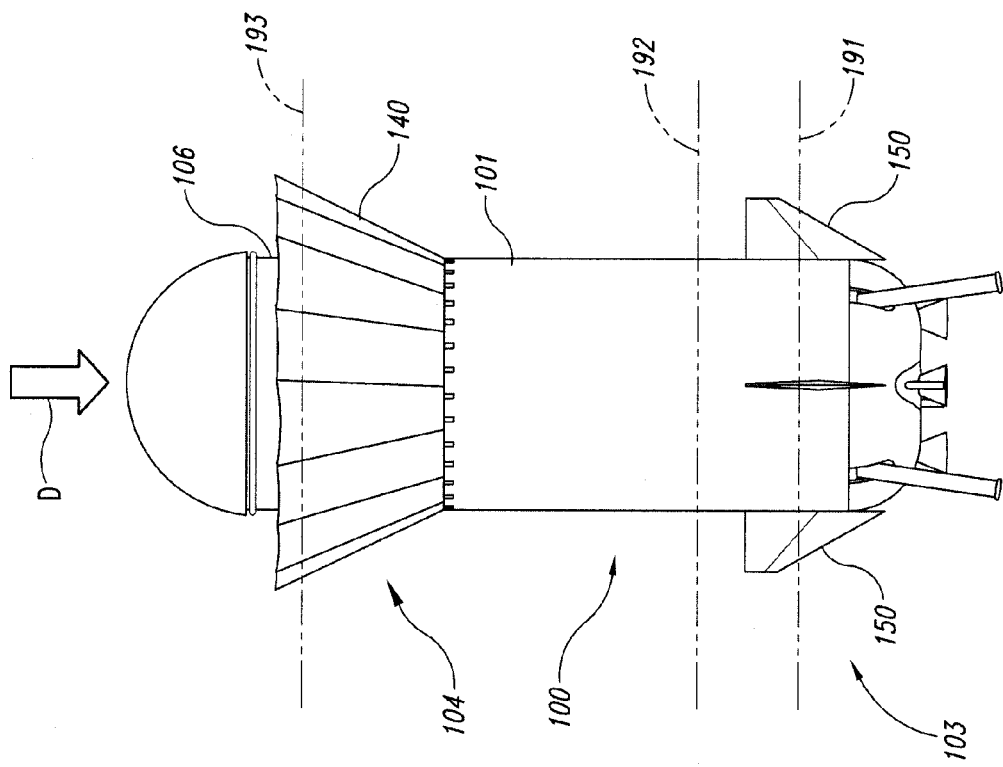
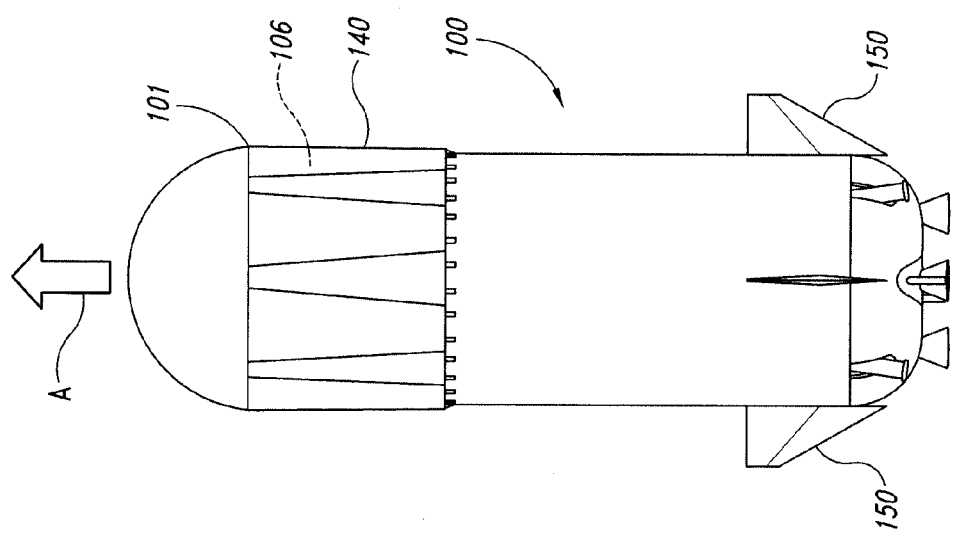
Fig. 2A
Fig. 2B

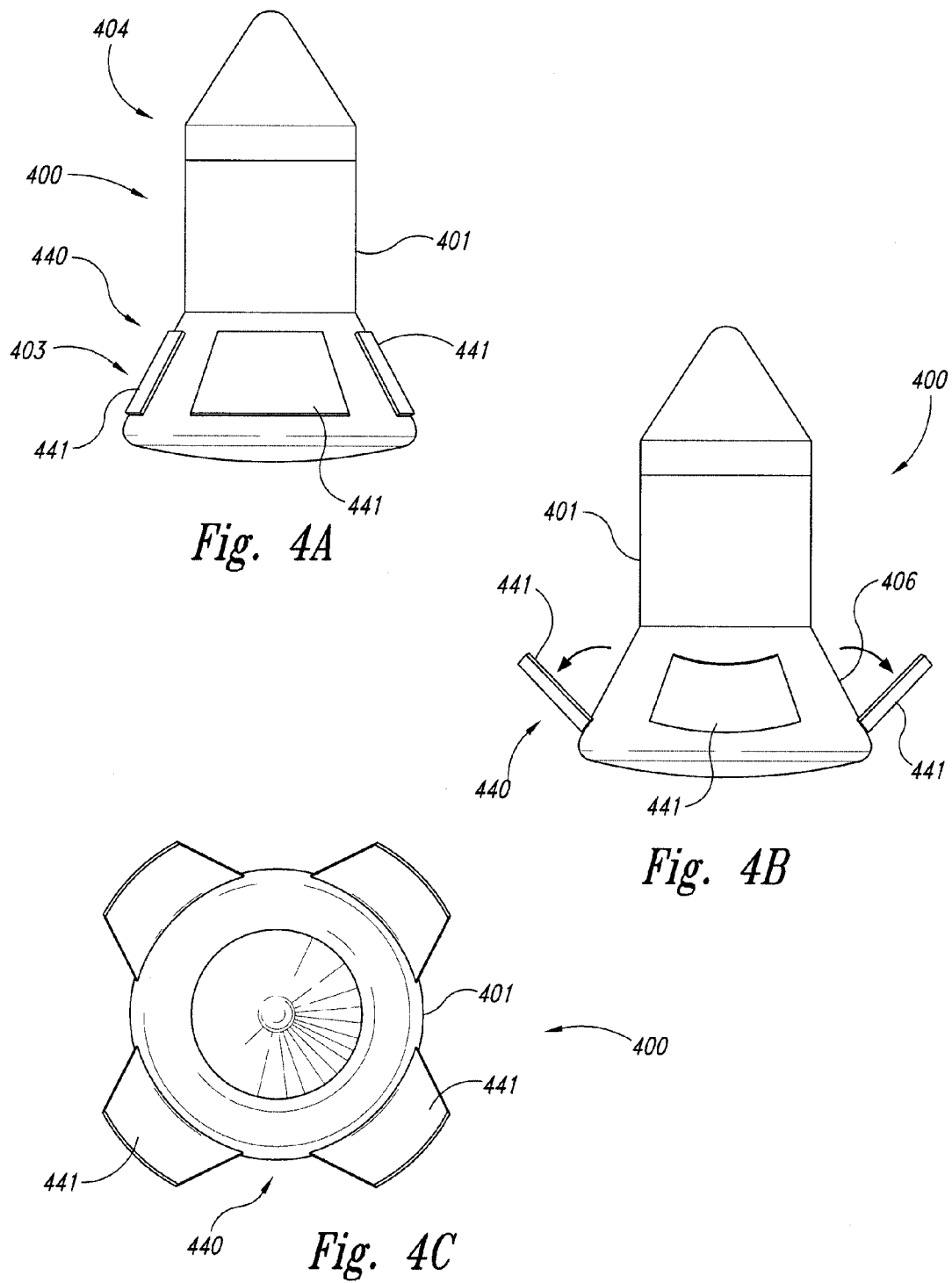

LAUNCH VEHICLES WITH RING-SHAPED EXTERNAL ELEMENTS, AND ASSOCIATED SYSTEMS AND METHODS

TECHNICAL FIELD

The present disclosure is directed generally to launch vehicles with ring-shaped external elements, and associated systems and methods.

BACKGROUND

Rockets have been used for many years to launch human and non-human payloads into orbit. Such rockets delivered the first humans to space and to the moon, and have launched countless satellites into the earth's orbit and beyond. Such rockets are used to propel unmanned space probes and more recently to deliver structures, supplies, and personnel to the orbiting international space station.

One continual challenge associated with rocket missions is the reusability of the system. Aspects of the present disclosure are directed to addressing this challenge.

BRIEF DESCRIPTION OF THE DRAWINGS

FIGS. 1A and 1B illustrate a representative vehicle having a deployable flare surface in accordance with an embodiment of the disclosure.

FIGS. 2A and 2B illustrate a representative vehicle during ascent and descent, respectively, in accordance with an embodiment of the disclosure.

FIG. 4A is a partially schematic, side elevation view of a vehicle having stowed deployable surfaces configured in accordance with another embodiment of the disclosure.

FIG. 4B is a partially schematic, side elevation view of the vehicle shown in FIG. 4A, with the deployable surfaces deployed.

FIG. 4C is a partially schematic, plan view of the vehicle shown in FIG. 4B, with the deployable surfaces deployed.

DETAILED DESCRIPTION

Figure 3A:
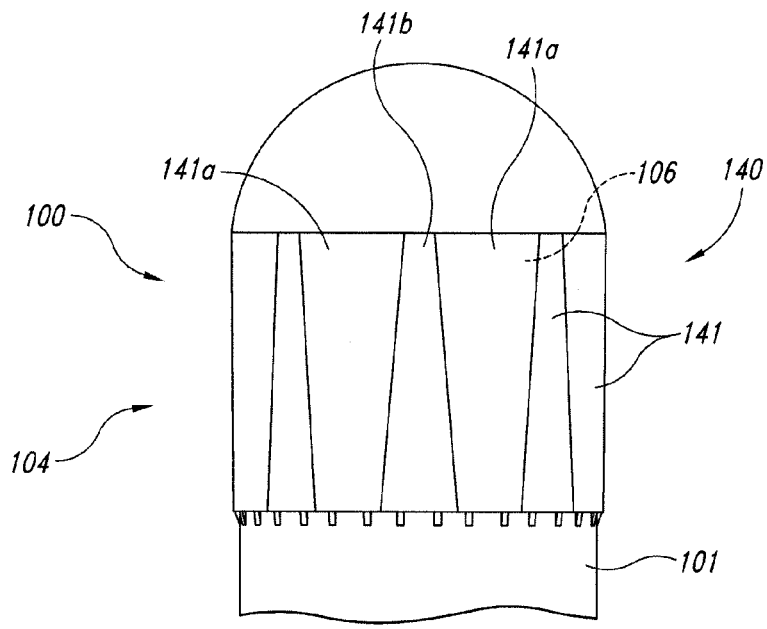
FIGS. 3A and 3B are enlarged illustrations of a portion of a representative vehicle illustrating a deployable flare surface in a stowed position and a deployed position, respectively.

The present disclosure is directed generally to launch vehicles (e.g., rockets) with ring-shaped external elements, and/or fixed and deployable deceleration surfaces, and associated systems and methods. Several details describing structures and processes that are well-known and often associated with rocket flow surfaces and/or other structures are not set forth in the following description for purposes of brevity. Moreover, although the following disclosure sets forth several embodiments, several other embodiments can have different configurations, arrangements, and/or components than those described in this section. In particular, other embodiments may have additional elements, and/or may lack one or more of the elements described below with reference to FIGS. 1A-16.

Many embodiments of the technology described below may take the form of computer-executable instructions, including routines executed by a programmable computer or controller. Those skilled in the relevant art will appreciate that the technology can be practiced on computer systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini-computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. In particular embodiments, data structures and transmissions of data particular to aspects of the technology are also encompassed within the scope of the technology.

FIG. 1A is a top isometric illustration of a vehicle 100 configured in accordance with an embodiment of the disclosure. FIG. 1B is a side elevation view of the vehicle 100 shown in FIG. 1A. Referring to FIGS. 1A and 1B, the vehicle 100 can be a rocket (e.g., an orbital or suborbital vehicle) that includes a propulsion module 110 carrying a payload module 130. The propulsion module 110 can include one or more engines having corresponding engine exhaust nozzles 111 positioned toward a first or aft end 105 of the vehicle 100. The vehicle 100 can be elongated along a longitudinal vehicle axis V, with an outwardly facing, exposed surface 101 having a first region 103 toward the first end 105, and a second region 104 positioned toward a second or forward end 102 of the vehicle 100. The vehicle 100 can include landing gear 120 positioned toward the first end 105 to allow the vehicle 100 to land in a tail-down orientation. The vehicle 100 can further include a deployable or otherwise movable deceleration surface (e.g., a flare surface) 140 positioned toward the second end 102 of the vehicle 100. The deployable surface 140 can be stowed during ascent and deployed during descent to stabilize and reduce the speed of the vehicle 100 during a tail-down descent and landing. In particular embodiments, the deployable deceleration surface 140 can elevate the aerodynamic center of pressure of the vehicle 100 (e.g., above the center of gravity of the vehicle 100) in such a manner as to improve stability and/or improve the ratio of vehicle aerodynamic lift to drag during a tail-down descent and landing. Fins 150 toward the aft end 105 of the vehicle 100 can act as stabilizers and/or control surfaces during ascent, and can also act as stabilizers and/or control surfaces during descent. Accordingly, the fins 150 can be operated in a forward direction (e.g., during ascent), and in a reverse direction (e.g., during descent), as described further in co-pending U.S. application Ser. No. 12/712,083, titled "BIDIRECTIONAL CONTROL SURFACES FOR USE WITH HIGH SPEED VEHICLES, AND ASSOCIATED SYSTEMS AND METHODS" and filed on Feb. 24, 2010.

In a particular embodiment, the payload module 130 can be configured to carry cargo and/or crew. In an embodiment shown in FIGS. 1A and 1B, the payload module 130 can have a hemispherical shape and in other embodiments, the payload module 130 can have other shapes.

In a particular embodiment, the vehicle 100 includes five engines internal to the vehicle 100 (and not visible in FIGS. 1A and 1B), each having a corresponding engine exhaust nozzle 111. The engines are used during the boost phase to propel the vehicle 100 upwardly (e.g., vertically, with or without a downrange component). Optionally, the engines can also provide thrust vectoring to steer the vehicle 100 during the boost phase, alone or in combination with other control systems.

After the engines have completed the boost phase, the deployable surface 140 can be deployed to slow the descent of the vehicle 100. The deployable surface 140 can improve vehicle stability as the vehicle 100 descends (tail-down) by increasing vehicle drag and by reducing the terminal velocity of the vehicle 100 before the engines restart prior to a vertical landing. In a particular embodiment, the deployable surface 140 is used only once during flight, and is then retracted by the ground crew after the vehicle 100 has landed. The fins 150 can be used to control and steer the vehicle 100 during descent and landing. Accordingly, the vehicle 100 can be steered directly back to the site from which it was launched. In other embodiments, the vehicle 100 can be steered to other sites. In any of these embodiments, as the vehicle 100 approaches the landing site, the engines can be restarted to further slow the vehicle 100 down. The landing gear 120 are then deployed for final touchdown.

FIG. 2A is a partially schematic, side elevation view of an embodiment of the vehicle 100 during its ascent, indicated by arrow A. During the ascent phase, the deployable surface 140 (which forms part of the external surface 101) is stowed and can accordingly be positioned flat against an underlying surface 106 of the vehicle 100, and generally flush with the rest of the external surface 101. During the ascent phase, the landing gear 120 (FIGS. 1A, 1B) are stowed.

FIG. 2B illustrates the vehicle 100 during its descent phase, indicated by arrow D. During descent, the deployable surface 140 is deployed, e.g., by pivoting the surface 140 so that it expands outwardly from the underlying surface 106. As discussed above, this configuration is expected to slow the vehicle 100 down and can also stabilize the vehicle. For example, as noted above, deploying the surface 140 can shift the center of pressure acting on the vehicle 100 upwards (e.g., above the vehicle center of gravity) so that gravitational forces on the vehicle 100 tend to stabilize perturbations that may be caused by aerodynamic forces acting on the vehicle 100.

One effect of deploying the surface 140 is to increase the cross-sectional area or planform footprint of the vehicle 100 at the second region 104, relative to the first region 103. For example, the cross-sectional area of the vehicle 100 taken at a first station 191 (including the cross-sectional area of the fins 150) or a second station 192, both located within the first region 103, will be less than the cross-sectional area of the vehicle 100 at a third station 193, located in the second region 104 when the deployable surface 140 is deployed. This change in cross-sectional area can be temporary, by virtue of the ability to subsequently stow or otherwise move the deployable surface 140. In other embodiments described later with reference to FIGS. 7-10, the increased cross-sectional area can be a fixed part of the vehicle external geometry.

FIG. 3A is a partially schematic, side view of the second region 104 of the vehicle 100, with the deployable surface 140 stowed, for example, during a boost or ascent phase of the vehicle 100. The deployable surface 140 can include multiple, deployable petals 141 or other suitable surfaces or surface elements. In the stowed configuration, the petals 141 are closed up against the underlying surface 106 of the vehicle 100. Accordingly, the petals 141 can be formed from sections of a cylinder so as to conform to the shape of the cylindrical external surface 101. In other embodiments, the petals 141 can have other shapes. In any of these embodiments, outer petals 141a can alternate with and overlap intermediate inner petals 141b.

Figure 3B:
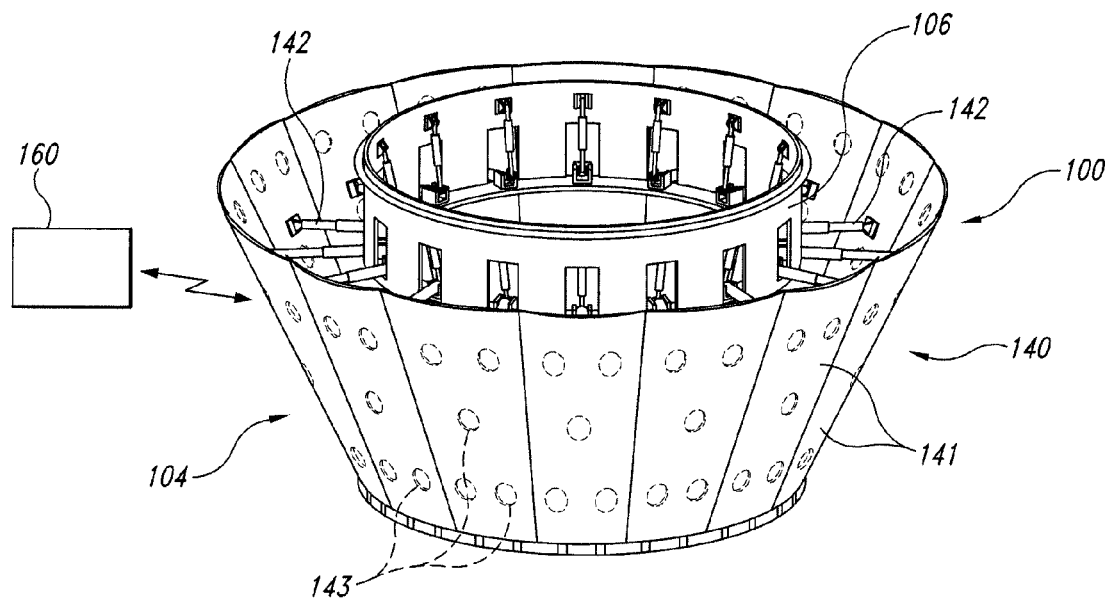

FIG. 3B is a partially schematic, top isometric illustration of the second region 104 of the vehicle 100, illustrating the deployable surface 140 in a deployed configuration. In this configuration, the petals 141 have been pivoted outwardly from the underlying surface 106 of the vehicle 100, for example, via one or more actuators 142. In a particular embodiment, adjacent petals 141 can overlap each other when stowed, and can overlap or abut each other when deployed. In other embodiments, the petals 141 can be spaced apart or at least partially spaced apart when deployed. The particular arrangement selected for the deployable surface 140 can depend upon the level of braking expected to be provided by the deployable surface 140, integration with the vehicle 100, and/or other factors.

In a particular embodiment, the deployable surface 140 includes 16 petals 141, each deployed by a separate pneumatic, hydraulic, electric or other actuator. The petals 141 can overlap with each other when stowed, with a first set of eight petals 141 positioned outside and a second set of eight petals 141 positioned inside and interleaved with petals of the first set, so that no significant gaps exist between adjacent petals 141 when the flare 140 is fully deployed. The vehicle 100 can include retention latches or other features that hold the petals 141 in the stowed position before the command is given to open them. In a particular embodiment, the second region 104 of the vehicle 100 can include composite sandwich panels, backed by aluminum ring frames for additional stiffness. The petals 141 can also be formed from composite sandwich panels. In other embodiments, any of these structures can have other compositions.

In a particular embodiment, the individual petals 141 are moved in concert, so that each one moves by the same amount, at the same rate and in the same direction (e.g., outwardly or inwardly) as the others. In other embodiments, the individual petals 141 of the deployable surface 140 can be individually movable and/or controllable. In such embodiments, the petals 141 can be moved relative to each other at different rates, by different amounts and/or in different directions, e.g., to steer the vehicle 100 in addition to slowing it down. The motion of the petals 141 can be controlled by a controller 160. In one embodiment, the controller 160 is an electromechanical device that is carried by the vehicle 100. In other embodiments, the controller 160 is a digital or computer-based device 160 carried by the vehicle 100 or based on the ground, and having computer-readable media containing appropriate instructions. The controller 160 can receive input signals from any of a variety of sensors (e.g., an accelerometer, a GPS sensor, an altitude sensor, a pressure sensor, or a time sensor (e.g., a clock)), on the basis of which the controller 160 issues instructions for operating the petals 141. The controller 160 can control other vehicle functions as well, e.g., the operation of the engines, landing gear and control surfaces.

As discussed above, the petals 141 can sealably engage with each other when deployed. In other embodiments, neighboring petals can be spaced apart from each other when deployed, forming axially extending gaps. In still another embodiment, the petals 141 can be vented. For example, the petals 141 can include vent openings 143 (shown in dashed lines in FIG. 3B) that allow air to pass through the petals 141. The vent openings 143 can be arranged in a checkerboard or other suitable pattern. In further aspect of this embodiment, individual vent openings 143 can be selectively opened and closed (e.g., via an actuated panel, iris, or other suitable device) to control the flow of air through the openings 143. In this manner, the drag created by the deployable surface 140 can be controlled. In a further aspect of this embodiment, the vent openings 143 at one circumferential location can be opened and those at another circumferential location can be closed to provide a differential drag that can in turn be used to steer the vehicle 100.

In the embodiments described above with reference to FIGS. 1A-3B, the deployable surface is positioned toward the upper or second end of the vehicle. FIG. 4A is a partially schematic, side elevation view of a vehicle 400 having a deployable surface located toward the lower end in accordance with another embodiment of the disclosure. In one aspect of this embodiment, the vehicle 400 has an external surface 401 with a first or lower region 403 having an outwardly flared shape, and a second or upper region 404 above the first region 403. The deployable surface 440 located at the first region 403. The deployable surface 440 can include four deployable panels 441 (three of which are visible in FIG. 4A) which are shown in the stowed position. FIGS. 4B and 4C illustrate side elevation and plan views, respectively, of the vehicle 400, with the deployable surface 440 in the deployed position. In this position, the panels 441 are pivoted outwardly away from an underlying surface 406 of the vehicle 400 to increase the cross-sectional area of the vehicle 400 beyond that produced by the flared outer surface 401 at the first region 403. This arrangement can further enhance the stability of the flared body shape on descent.

Figures 5A, 5B:
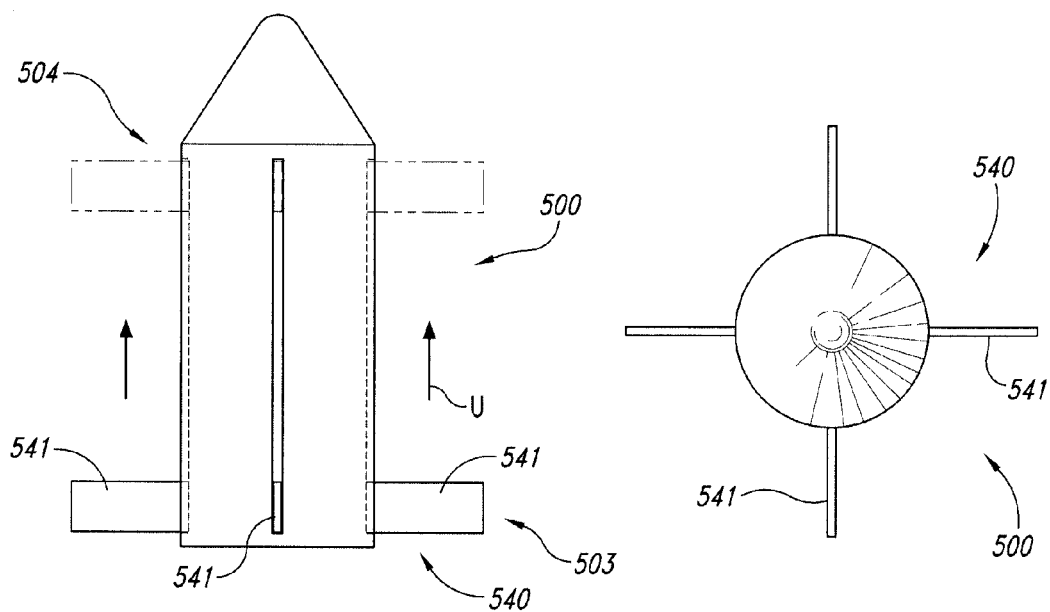
FIGS. 5A and 5B are partially schematic, side elevation and plan views, respectively, of a vehicle having translating surfaces in accordance with an embodiment of the disclosure.

FIG. 5A is a partially schematic, side elevation view of a vehicle 500 having a deployable surface 540 that translates rather than pivots during operation. FIG. 5B is a partially schematic, top plan view of the vehicle 500 shown in FIG. 5A. Referring now to FIGS. 5A and 5B together, the deployable surface 540 can include multiple fin or vane elements 541 (four are shown in FIGS. 5A and 5B) that are positioned toward a first or lower region 503 of the vehicle 500 during ascent. Accordingly, the deployable surfaces 540 can provide stability and, optionally, control of the vehicle 540 from a position below the vehicle center of gravity. Prior to or during a tail-down descent, the fin elements 541 translate upwardly as indicated by arrows U so as to be located at a second or upper region 504 of the vehicle. In this position, the fin elements 541 can act to move the center of pressure of the vehicle 500 upwardly, for example, above the vehicle center of gravity. Because the fin elements 541 are lift-generating devices, the vehicle will typically cant over from a purely vertical inclination to provide an angle of attack that allows the fins to generate sufficient lift. The vehicle 500 can return to a fully vertical position prior to touching down. The vehicle 500 can include tracks, rails, or other suitable guide structures to guide the translational motion of the fin elements 541.

Figures 6A, 6B:
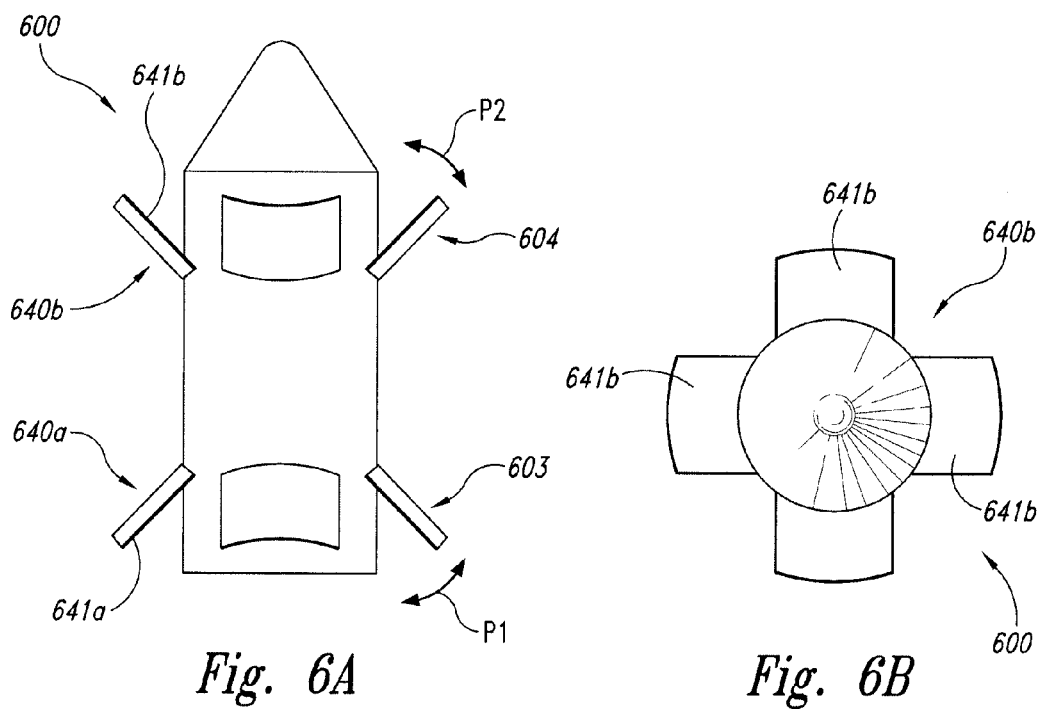
FIGS. 6A and 6B are partially schematic, side elevation and plan views, respectively, of a vehicle having two sets of deployable flare surfaces in accordance with an embodiment of the disclosure.

FIGS. 6A and 6B are partially schematic, side elevation and top plan views, respectively, of a vehicle 600 having multiple deployable surfaces that operate in concert to control the location of the vehicle center of pressure relative to the vehicle center of gravity. In particular, the vehicle 600 can include a first or lower deployable surface 640a positioned at a first or lower region 603 of the vehicle 600, and a second or upper deployable surface 640b positioned at a second or upper region 604 of the vehicle 600. The first deployable surface 640a can include first flare elements 641a, and the second deployable surface 640b can include second flare elements 641b. Both the first flare elements 641a and the second flare element 641b can deploy outwardly relative to the vehicle 600 and then return to a stowed position as indicated by arrows P1 and P2, respectively. During ascent, the second flare elements 641b can be stowed generally parallel to the external surface of the vehicle 600, while the first flare elements 641a are pivoted outwardly to provide stability and/or control. In a particular embodiment, the first flare elements 641a can remain stowed during ascent, unless needed to provide additional stability. Such a need may arise if one or more engines fail during ascent. During descent, the relative orientations of the first and second flare elements 641a, 641b can be reversed. In particular, the first flare elements 641a can be stowed generally parallel to the exterior surface of the vehicle 600, while the second flare elements 641b are deployed to provide a center of pressure movement generally similar to that described above with reference to FIGS. 1A-2B.

In several of the embodiments described above with reference to FIGS. 1A-6B, deployable surfaces control the change in center of pressure between vehicle ascent and vehicle descent. Still further arrangements that include deployable surfaces are described later with reference to FIGS. 11-16. In other embodiments, described below with reference to FIGS. 7-10, the overall shape of the vehicle can remain fixed, but can have a cross-sectional shape variation between the lower end of the vehicle and the upper end of the vehicle that provides increased drag during descent when compared to a conventional cylindrical or upwardly and inwardly tapered rocket shape. Accordingly, the external surface of the vehicle can be positioned (e.g., fixed) or positionable (e.g., movable) to achieve the desired cross-sectional shape variation.

Figure 7:
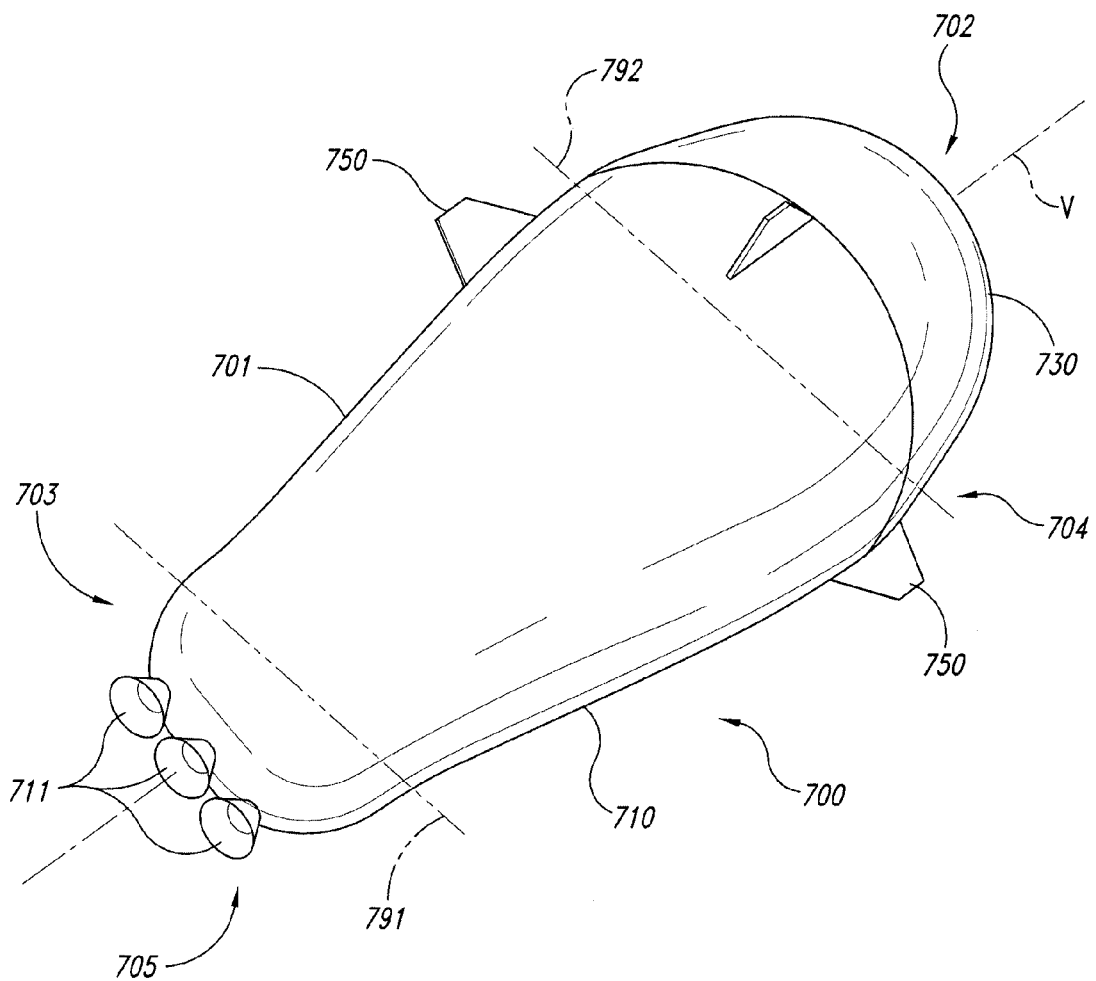
FIG. 7 is a partially schematic, isometric illustration of a vehicle having an upwardly and outwardly tapered shape in accordance with an embodiment of the disclosure.

FIG. 7 is a partially schematic, isometric illustration of a launch vehicle 700 elongated along a vehicle axis V between a first end 705 and a second end 702. The vehicle 700 includes a payload module 730 toward the second end 702, and a propulsion module 710 with one or more exhaust nozzles 711 toward the first end 705. In a particular embodiment, the vehicle 700 includes three exhaust nozzles 711, the outer two of which are fixed, and the center one of which is vectorable for vehicle control. In other embodiments, the vehicle 700 can have other numbers and/or arrangements of engines and associated nozzles. The vehicle 700 can also include fins 750 that may be actuated to provide additional vehicle control during both ascent and descent. An external surface 701 of the vehicle 700 includes a first region 703 toward the first end 705, and a second region 704 toward the second end 702. The cross-sectional area of the vehicle 700 bounded by the external surface 701 increases along the vehicle axis V from the first region 703 to the second region 704. Accordingly, a cross-sectional area of the vehicle 700 at a first station 791 in the first region 703 is smaller than the corresponding cross-sectional area at a second station 792 located in the second region 704.

The shape of the external surface 701 of the propulsion module 710 and the payload module 730 can be selected to produce the desired drag characteristics for both ascent and descent. In particular, the shape of the external surface 701 is generally selected to reduce or minimize buffet during ascent, particularly at transonic speeds, while providing aerodynamic forces that stabilize the vehicle during tail-down descent.

One characteristic of the arrangement described above with reference to FIG. 7 is that it can eliminate the need for deployable deceleration surfaces. Accordingly, it is expected that this arrangement may reduce the overall vehicle weight. Conversely, an expected advantage of the deployable surfaces described above with reference to FIGS. 1A-6B is that they may provide more decelerating force than the drag produced by the outer mold line (OML) of the vehicle 700, thereby reducing the amount of fuel used by the engines to decelerate the vehicle during descent. This arrangement can offset or partially offset the additional weight expected to result from the deployable surfaces. The particular selection of deceleration surfaces (e.g., deployable surfaces or fixed, flared surfaces) can depend on a variety of factors, including the mission that the vehicle is to undertake, and the payload the vehicle is to carry. These two arrangements need not be mutually exclusive. Accordingly, in other embodiments, deployable surfaces may be combined with fixed OML shapes to provide the desired combination of deceleration forces and vehicle weight.

Figure 8A:
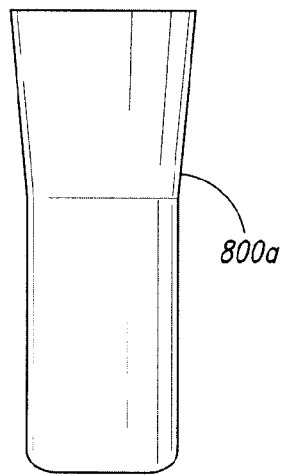
FIGS. 8A-8F are partially schematic, side elevation views of portions of vehicles having upwardly and outwardly tapered shapes in accordance with further embodiments of the disclosure.
Figure 8B:
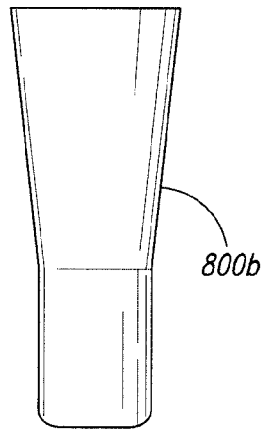
Figure 8C:
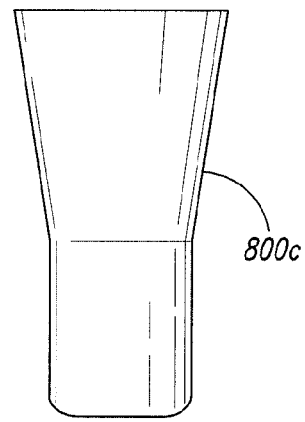
Figure 8D:
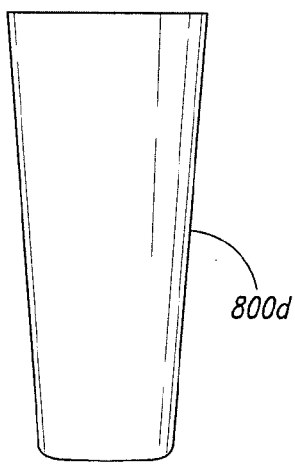
Figure 8E:
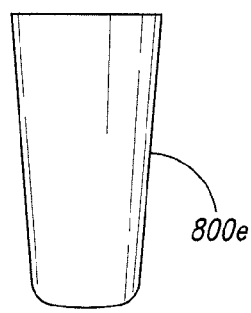
Figure 8F:
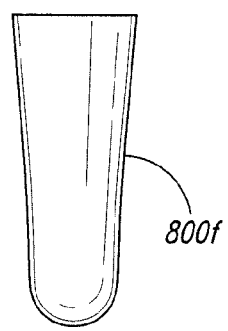

Whether used alone or in combination with deployable deceleration surfaces, the fixed outer surface of the vehicle can have a variety of shapes that are expected to increase drag during vehicle descent, without unduly adding to vehicle drag during ascent. FIGS. 8A-8F illustrate a representative selection of such vehicle shapes. For purposes of illustration, the payload modules and engine/nozzle arrangements, as well as other external vehicle features (e.g., fins) are not shown in FIGS. 8A-8F. During operation, the payload module may descend separately from the propulsion module as shown in FIGS. 8A-8F, or it can remain attached to the propulsion module during descent, as shown in FIG. 7. FIGS. 8A-8C illustrate corresponding vehicles 800a, 800b, 800c, respectively, having OML surfaces that vary in a non-monotonic manner over the length of the corresponding vehicle axis. In particular, these shapes include a generally cylindrical portion toward the lower end of the vehicle, and an outwardly, upwardly tapering section toward the upper end of the vehicle. The taper can be linear (e.g., conical) or nonlinear (e.g., concave or convex). In other embodiments, illustrated in FIGS. 8D, 8E and 8F, corresponding vehicles 800d, 800e and 800f, respectively, include external surfaces that taper in a continuous manner from the lower end of the vehicle to the junction with the corresponding payload capsule (not shown). The particular divergence angle of the surfaces relative to the vehicle axis can be selected in a manner that depends, for example, on the vehicle mission and the vehicle payload to provide a large amount of drag during descent, and a small and incremental increase in drag during ascent.

In any of the foregoing embodiments, fuel is carried in tanks positioned within (or forming part of) the external surface of the vehicle. Liquid propellant tanks configured in accordance with particular embodiments of the present disclosure, and suitable for launch vehicles, have shapes that are customized so as to (a) reduce the dynamic effects of sloshing fluid within the tank, and (b) fit within the upwardly, outwardly tapered vehicle OML. For example, the tank OML can be varied by modulating the radius of the tank so as to reduce the destabilizing effects of the sloshing fluid. In a further particular aspect of this embodiment, the fuel tank can include internal slosh baffles that are molded into a plastic tank liner. This arrangement can eliminate the need to mechanically fasten baffles inside the tank. In other embodiments, the baffles can be formed from within the tank. In a further aspect of the foregoing embodiments, the shape of the tank can be configured to enhance and/or optimize the propellant's center of mass location within the vehicle so as to reduce the destabilizing effects that might otherwise result when liquid propellant within the tank sloshes during normal operations.

Figure 9:
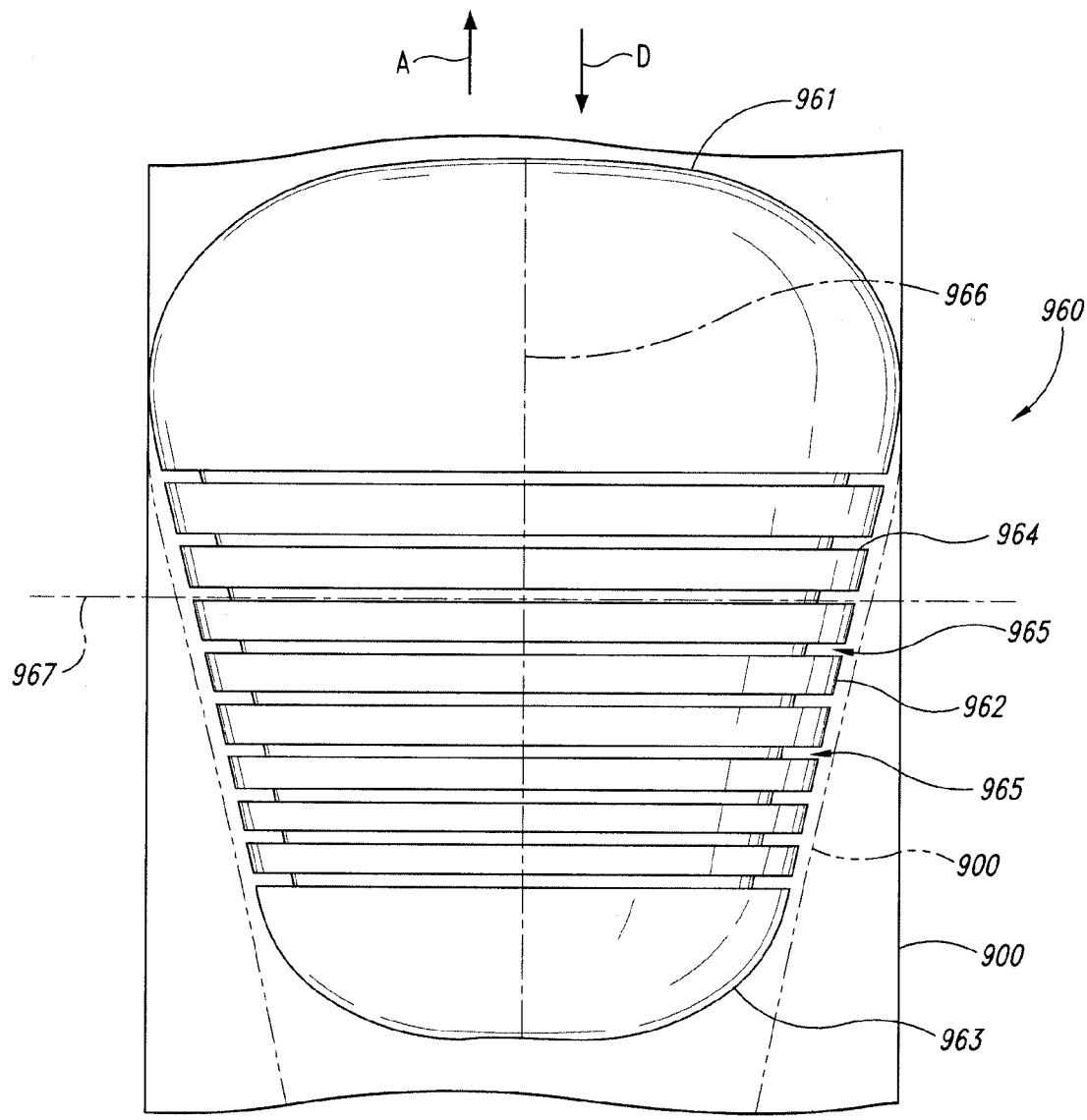
FIG. 9 is a partially schematic, isometric illustration of a fuel tank having a shape and features configured in accordance with still another embodiment of the disclosure.

FIG. 9 is a partially schematic, side elevation view of a portion of a vehicle 900 (e.g., a rocket) having a fuel tank 960 configured in accordance with a particular embodiment of the disclosure. The vehicle 900 can have a generally cylindrical shape as shown in solid lines in FIG. 9, or the vehicle can have any of the upwardly, outwardly tapered shapes described above, as shown in dashed lines in FIG. 9. In a particular aspect of this embodiment, the liquid propellant tank 960 has a larger forward or upper region 961 with a generally dome-shaped external surface, and smaller aft or lower region 963 also with a generally dome-shaped external surface, but with a smaller diameter than that of the forward region 961. The upper and lower regions 961, 963 can be positioned on opposite sides of an intermediate region 962 having a generally conical shape with a radius that varies linearly with length. Accordingly, the tank 960 can have an overall "pear" type shape, and can be symmetric about a tank longitudinal midline axis 966. However, the shape of the tank 960 is asymmetric relative to a lateral midline axis 967. This shape can be selected based on the available height and volume inside the vehicle 900, by the desire to adjust the propellant center of mass from high in the vehicle 900 during ascent to lower in the vehicle 900 during descent, by the shape (e.g., tapered shape) of the vehicle OML, and/or by the desire to modulate the slosh damping requirement for various propellant fill fractions.

As discussed above, the vehicle 900 can be configured to move in a forward direction (e.g., nose first) during ascent, as indicated by arrow A, and can move in an aft direction (e.g., tail first) during descent, as indicated by arrow D. In at least some embodiments, it is desired to keep the propellant center of mass high in the vehicle 900 during ascent. In addition, fuel slosh is less of an issue at the higher fill fractions associated with ascent. Accordingly, the radius of the forward region 961 can be relatively large relative to the width or diameter of the vehicle 900. As the propellant free surface drops below the forward region 961 and into the intermediate region 962, the propellant center of mass drops more rapidly because the propellant generally flows out of the tank 960 at a constant volumetric rate, and the tank radius reduces linearly with length. This brings the center of mass lower in the vehicle 900 to a more desired location for descent stability. The center of mass can accordingly drop more rapidly during later phases of ascent and/or during descent.

In a particular aspect of an embodiment shown in FIG. 9, the fuel tank 960 can include features that restrict the tendency for fuel to slosh within the tank 960. For example, the tank 960 can include baffles 964 that extend inwardly into the interior region of the tank 960 to control (e.g., reduce) sloshing. Because slosh frequency and sloshing mass are both nonlinear functions of tank radius, the decreasing tank radius results in a reduction of the sloshing mass and an increase in the slosh frequency, both of which reduce the slosh damping required to maintain vehicle control stability. By lowering the propellant center of mass at lower fill fractions (when slosh is more critical), the moment arm from the propellant center of mass to the vehicle center of mass is shortened and accordingly, the slosh has a reduced destabilizing effect on the vehicle 900. Due to the tank shape, the propellant free surface drops nonlinearly during a constant outflow rate, and slosh amplitude takes some amount of time to develop. In particular embodiments, the spacing between neighboring slosh baffles 964 can be varied between the forward region 961 and the aft region 963, for example, to account for the above non-linearities. In other embodiments, the baffle spacing can be constant. Because the aft region 963 holds a much smaller amount of propellant volume, it is less likely that baffles 964 are required in this region, which can simplify the mold design and fabrication.

In a particular embodiment, the tank 960 can be formed from a molded plastic liner and graphite/epoxy overwrap. The liner can prevent contact between the fuel and the overwrap. Accordingly, the tank 960 can be used with fuels (e.g., peroxide fuels) that would otherwise be incompatible with the overwrap. In other embodiments, the tank 960 can carry other fuels and/or other constituents.

In any of the foregoing embodiments, it may be difficult to install traditional style baffles into the tank 960 because (in at least some embodiments), the tank liner is fabricated in one piece by rotational molding. Accordingly, one approach is to mold the slosh baffles 964 as part of the liner. The mold used for this operation can have inwardly extending flanges that form the baffles 964 and that are withdrawn in an outward direction when the mold is opened, so as to allow the tank 960 to be removed. This approach creates hollow cavities (e.g., gaps 965) open to the outer mold line of the liner. These cavities or gaps 965 can be filled with a low density foam or other material to provide some rigidity for the baffles 964 projecting into the tank, and to provide a smooth outer surface against which to filament-wind the graphite/epoxy overwrap.

Figure 10:
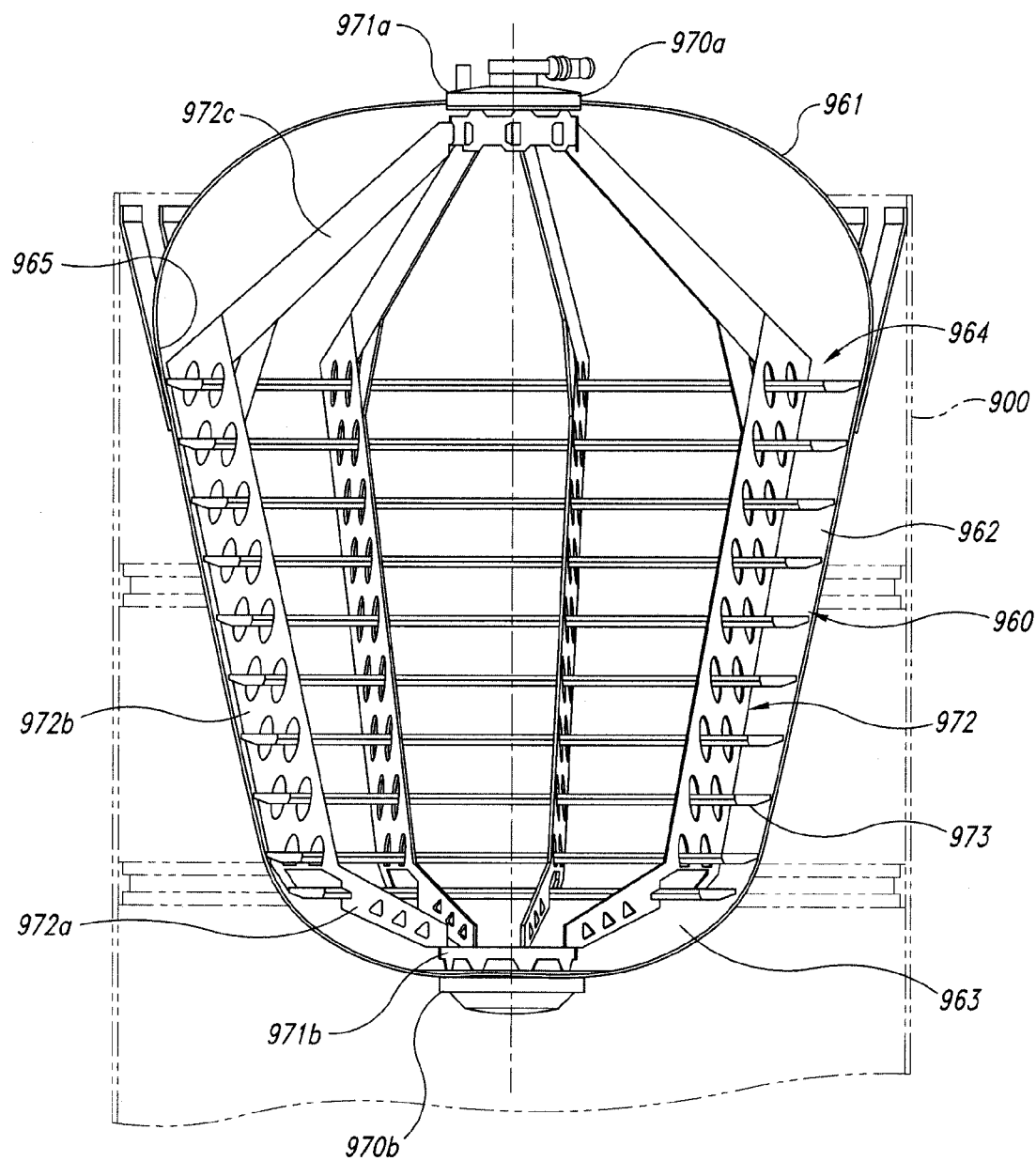
FIG. 10 is a partially cut-away side elevation view of a fuel tank configured in accordance with still another embodiment of the disclosure.

FIG. 10 is a partially schematic, partially cut-away illustration of a fuel tank 960 positioned in a vehicle 900 and having baffles 964 arranged and constructed in accordance with another embodiment of the disclosure. In one aspect of this embodiment, the fuel tank 960 is pre-formed (e.g., by rotational molding), and the baffles 964 are added afterwards. The tank 960 can include one or more manhole covers 970 (shown as a top manhole cover 970a and a bottom manhole cover 970b) to allow access to the interior of the tank 960. The covers 970 can also support appropriate fuel entry and/or exit ports in particular embodiments. Support rings 971 (shown as an upper support ring 971a and a lower support ring 971b) are positioned at the inside of the tank 960 and can be attached proximate to or directly to the manhole covers 970. The baffles 964 are connected between and supported by the upper support ring 971a and the lower support ring 971b. Accordingly, the baffles 964 can include axial baffle elements 972 that extend between the support rings 971a, 971b, and lateral baffle elements 973 that are connected to and extend between neighboring axial baffle elements 972. The axial baffle elements 972 can have a flat, panel-type shape and can form "grapefruit" baffles. In particular embodiments, the axial baffle elements 972 can be connected only to the upper support ring 971a and the lower support ring 971b. The lateral baffle elements 973 can also have a flat, panel-type shape, and can be arranged to form rings positioned within an inner wall 965 of the tank 960. The lateral baffle elements 973 can be connected only to the axial baffle elements 972. Accordingly, the baffle elements 972, 973 can reduce or prevent sloshing, without contacting the inner wall 965 of the tank 960. The axial baffle elements 972 and/or the lateral baffle elements 973 can be perforated, and can be formed from thin, lightweight materials (e.g., a suitable metal).

In a particular embodiment, the baffles 964 can be positioned within the tank by opening the upper manhole cover 970a and lowering an operator into the interior volume of the tank 960. The operator can receive the elements of the baffle 964 (e.g., the axial baffle elements 972 and the lateral baffle elements 973) and attach the elements to each other and to the support rings 971a, 971b. In a particular embodiment, the axial baffle elements 972 can initially include multiple components, e.g., a lower component 972a, an intermediate component 972b, and an upper component 972c. These components 972a-972c can be lowered separately into the tank 960 and assembled in situ by the operator within the tank. To prevent contact between the operator and the inner wall 965 of the tank 960, the operator can be supported by a trapeze or other suitable platform suspended from a gantry or other structure outside the tank. Depending upon the size of the access ports into the tank 960, certain of the components 972a-972c can be pre-attached prior to being lowered into the tank 960. For example, the lower component 972a and the upper component 972b can be attached to each other in a particular embodiment. If the access port is sufficiently large, the entire axial baffle element 972 can be lowered as a unit into the tank 960. The lateral baffle elements 973 can initially be segmented, e.g., with individual segments connected between neighboring axial baffle elements 973.

FIGS. 11-16 illustrate representative vehicles and vehicle systems configured in accordance with still further embodiments of the present technology. In many of these embodiments, the vehicles include annular elements that can facilitate operation of the vehicle or portions of the vehicle in two directions, typically ascent and descent. Accordingly, these structures and associated techniques can be used to both launch and retrieve a vehicle or portion or stage of a vehicle in a tail-down configuration.

Figure 11:
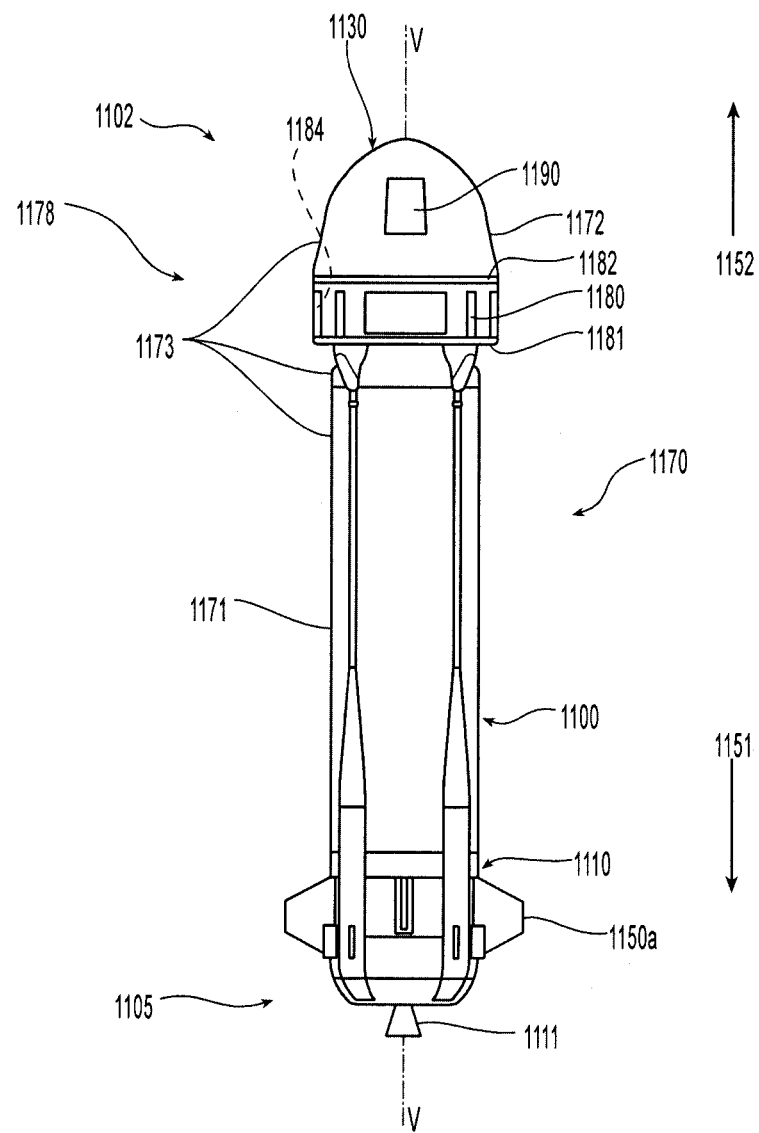
FIG. 11 is a partially schematic, side elevation view of a representative vehicle system having an annular element configured in accordance with an embodiment of the present technology.

FIG. 11 illustrates a system 1170 that includes a launch vehicle 1100 configured to ascend and descend in opposite directions but generally the same orientation, e.g., tail-down. Accordingly, the vehicle 1100 can descend in a first direction 1151 and ascend in a second direction 1152. The launch vehicle 1100 includes a first stage 1171 and a second stage 1172, which can carry a human and/or other payload in a payload module 1130. In other embodiments, the vehicle 1100 can have more than two stages. The vehicle 1100 carries a propulsion system 1110 in the first stage 1171, which in turn directs exhaust products through one or more nozzles 1111 positioned toward a first end 1105 of the vehicle 1100. The vehicle 1100 is elongated along a vehicle axis V, and the payload module 1130 can be positioned toward a second end 1102 of the vehicle. The vehicle 1100 can include a predetermined separation location 1178 at which the first stage 1171 separates from the second stage 1172, typically during ascent. The vehicle 1100 includes one or more outwardly facing external surfaces 1173. As used herein, the term "external surface" refers generally to a surface that is exposed to the environment external to the vehicle. Fins, e.g., first fins 1150*a*, provide stability to the vehicle 1100. A controller 1190 controls the operation of the vehicle 1100 and can be located on the vehicle 1100 and/or off the vehicle (e.g., on an air-, land-, sea- or space-based station).

The system 1170 can further include an annular element 1180 that is used to stabilize and/or control the vehicle 1100. The annular element 1180 can be positioned proximate to the separation location 1178 between the first stage 1171 and the second stage 1172. In a representative embodiment, the annular element 1180 is carried by the first stage 1171 so as to stabilize and/or guide the first stage 1171 to a tail-down landing after the first stage 1171 is separated from the second stage 1172. Accordingly, the position of the annular element 1180 relative to the overall length of the vehicle from which it depends is different depending upon whether the second stage 1172 is attached or separated. The annular element 1180 can include an inwardly facing external surface 1184 that faces toward the vehicle axis V. The inwardly facing external surface 1184, like the outwardly facing external surface 1173, is exposed to the environment external to the vehicle 1100, but generally faces inwardly toward the vehicle axis V rather than outwardly away from the vehicle axis V. The annular element 1180 can further include a first edge surface 1181 facing in the first direction 1151, and a second edge surface 1182 facing in the second direction 1152. In a particular embodiment, the second edge surface 1182 is shielded, or at least partially shielded, from the flow of air passing the vehicle 1100 during ascent, e.g., by being positioned downstream of the second stage 1172. In this configuration, the first edge surface 1181 forms a trailing edge when the second edge surface 1182 is shielded during ascent. After the second stage 1172 has separated from the launch vehicle 1100, and the first stage 1171 begins descending in the first direction 1151, the first edge surface 1181 forms a leading edge surface, and the now-exposed second edge surface 1182 forms a trailing edge surface. Further details of arrangements via which the annular element 1180 can stabilize as well as control the launch vehicle are described below.

Figure 12A:
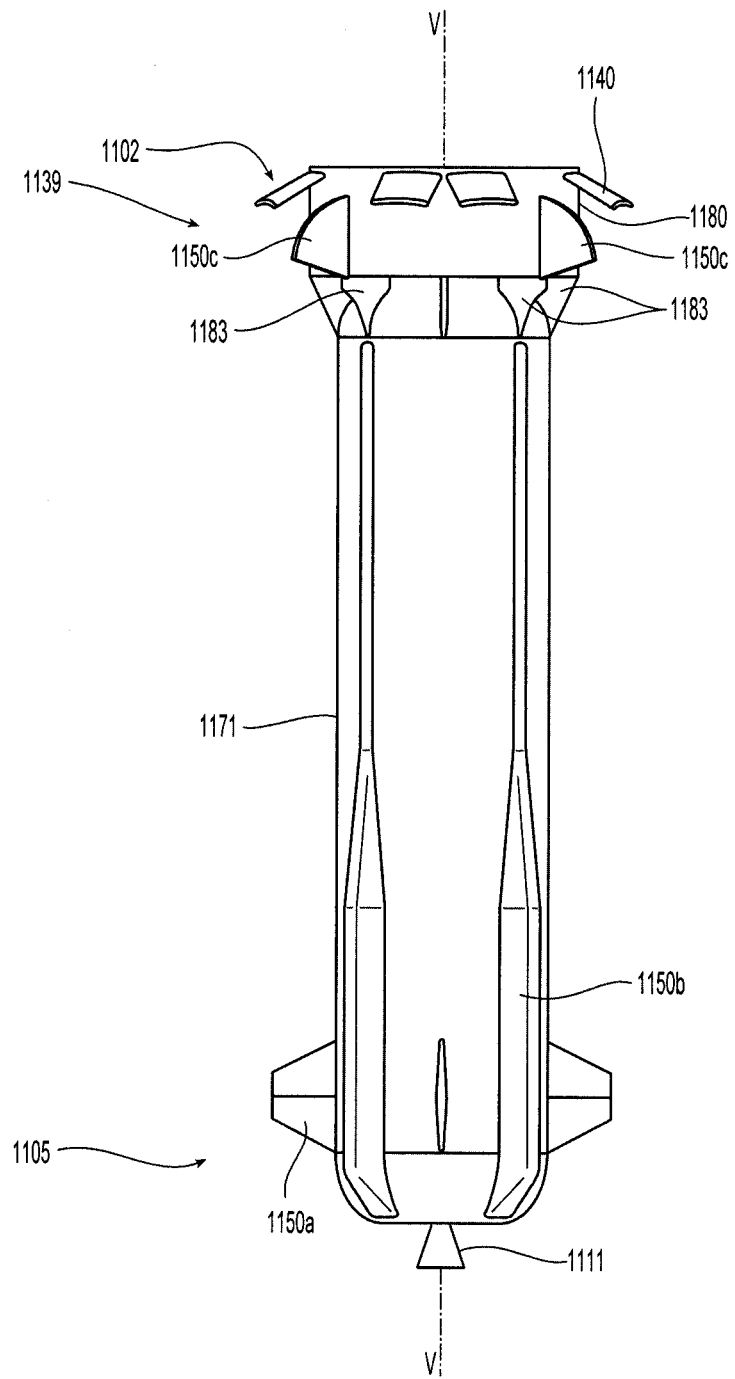
FIG. 12A is a partially schematic, side elevation view of an embodiment of the vehicle shown in FIG. 11, with the second stage removed.

FIG. 12A is a partially schematic, side elevation view of an embodiment of the first stage 1171 having many features generally similar to those described above with reference to FIG. 11, as well as several additional features. The additional features include second fins 1150*b* that can extend generally parallel to the vehicle axis V near the first end 1105 of the vehicle. In the illustration shown in FIG. 12A, the second stage 1172 (FIG. 11) has separated from the vehicle 1100. The annular element 1180 is carried by the first stage 1171 via one or more struts 1183, and can include one or more deployable elements 1139. The deployable elements 1139 can include one or more third fins 1150*c* and/or one or more aerodynamic brakes 1140. The third fins 1150*c* can be deployed to stabilize the vehicle 1100 as it travels in the first direction 1151. The brakes 1140 can be used to slow the vehicle's descent. In general, the third fins 1150*c* (and other fin surfaces) are aligned parallel to the vehicle axis V, and the brake surfaces are positioned at least partially transverse to the vehicle axis V. Any of the deployable surfaces 1139 can be deployed differentially (e.g., partially or not at all), compared to other deployable surfaces to provide appropriate steering.

Figure 12B:
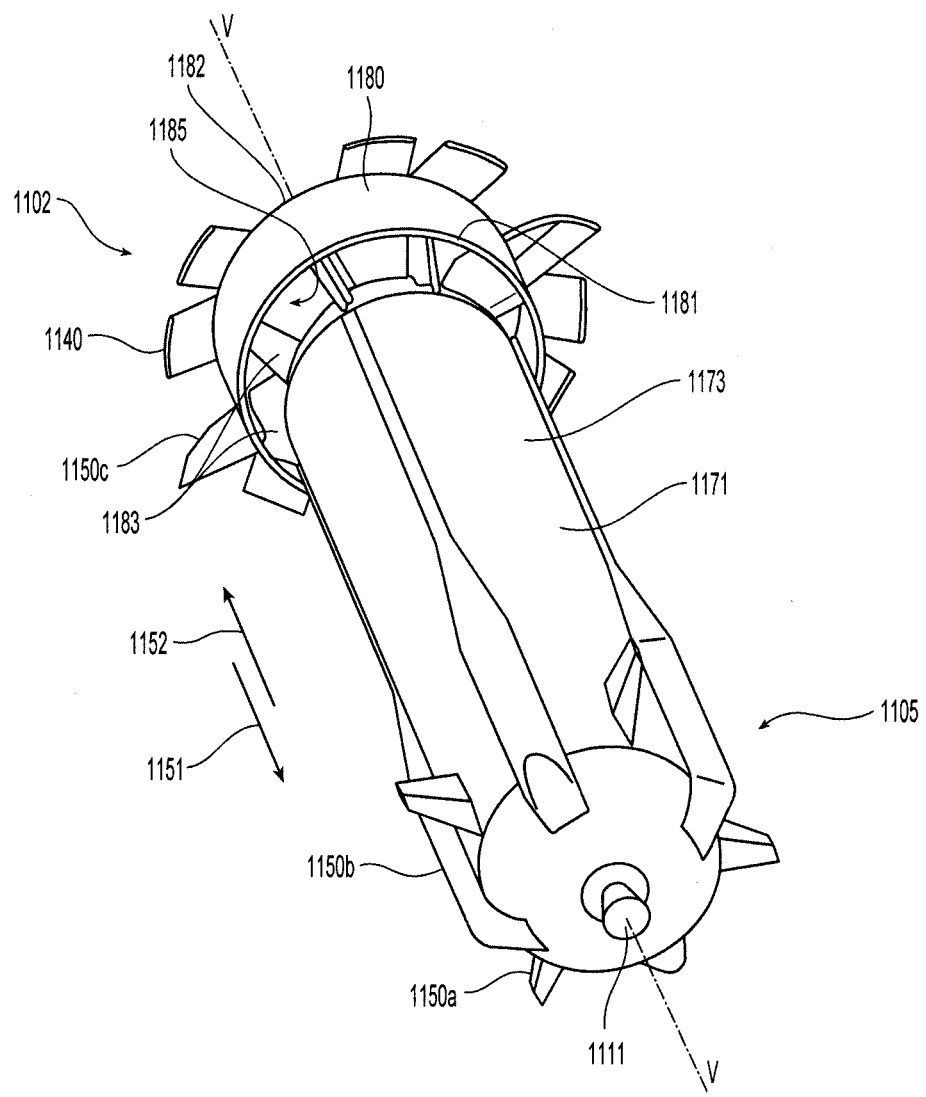
FIGS. 12B and 12C are isometric bottom and top views, respectively, of a representative embodiment of the vehicle shown in FIG. 12A.
Figure 12C:
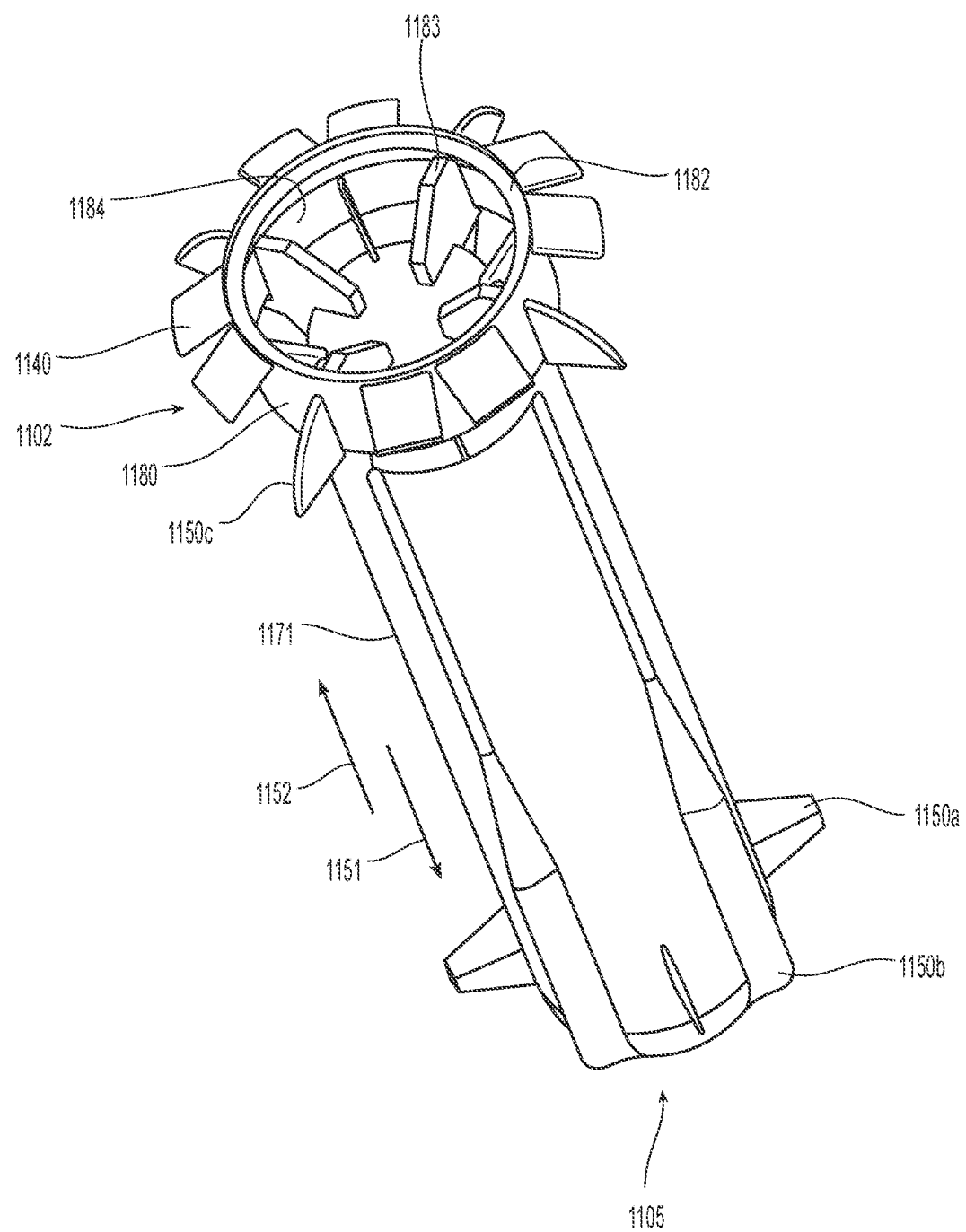

FIGS. 12B and 12C are, respectively, partially systematic top and bottom isometric views of an embodiment of the first stage 1171 shown in FIG. 12A. Referring first to FIG. 12B, the annular element 1180 is positioned radially outwardly from the vehicle axis V, and may also be positioned radially outwardly from the outwardly facing external surface 1173 of the first stage 1171. In this manner, with the second stage 1172 (FIG. 11) removed, an airflow or flow-through gap 1185 forms between the inwardly facing external surface 1184 of the annular element 1180, and the outwardly facing external surface 1173 of the first stage 1171. As the vehicle descends in the first direction 1151, air flows through the gap 1185, adjacent the struts 1183. Accordingly, the struts 1183 and the annular element 1180 can provide additional stability to the first stage 1171. Because these surfaces are positioned aft along the vehicle axis as the vehicle descends, they can provide stability not available via the forward-positioned first and second fins 1150*a*, 1150*b*. The aft-mounted brakes 1140 can also slow the descent of the vehicle 1100, as discussed above. In particular embodiments, the aft-mounted brakes 1140 are inverted relative to the orientation of the deployable surfaces 140 described above with reference to FIGS. 1A-3B. Accordingly, the brakes 1140 can be inclined or point into the adjacent flow as the vehicle 1100 descends to provide a significant increase in braking power.

In an embodiment shown in FIGS. 12B and 12C, the first edge surface 1181 forms a leading edge, and the second edge surface 1182 forms a trailing edge as the vehicle 1100 descends. In a particular aspect of this embodiment, the first edge surface 1181 can be sharpened or rounded to provide for smooth aerodynamic flow during descent. In another aspect of this embodiment, the second edge surface 1182 can be squared-off or blunted (e.g., to be blunter than the first edge surface 1181). The blunt trailing edge defined by the second edge surface 1182 in this configuration can provide for a predictable location at which flow separates from the annular element 1180 at angles of attack on ascent, thereby reducing the likelihood for the aerodynamic forces on the annular element 1180 to shift significantly as a result of changing separation locations at high angles of attack. While the blunt second edge surface 1182 may produce more drag on ascent than would a smooth edge surface, it is expected that this penalty is outweighed by the benefits described above. In addition, by reducing lift, the blunt second edge surface 1182 may reduce the likelihood for shifting aerodynamic forces during ascent, e.g., in crosswind conditions.

FIG. 12C is a top isometric view of the first stage 1171 shown in FIG. 12B, illustrating the squared or otherwise blunted second edge surface 1182. FIG. 12C also further illustrates the inwardly facing external surface 1184 of the annular element 1180. The third fins 1150c (which can be either fixed or deployable) are shown in FIG. 12C fixed or fully deployed. As discussed further below with reference to FIG. 13, the third fins 1150c can be partially deployed to provide more active, dynamic vehicle control.

Figure 13:
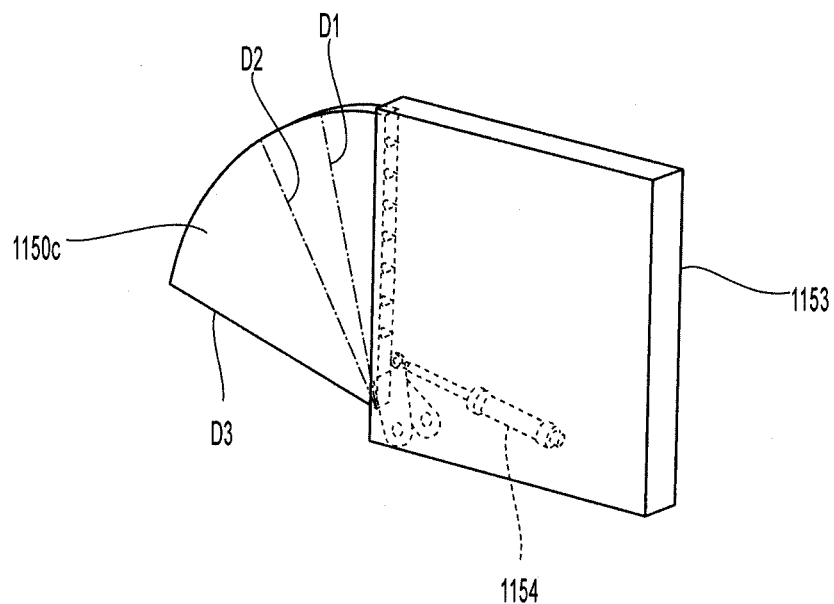
FIG. 13 is a partially schematic, isometric illustration of a deployable fin and associated housing configured in accordance with an embodiment of the present technology.

Referring now to FIG. 13, each third fin 1150c can be moveably positioned in a fin housing 1153, which extends inwardly toward the vehicle axis V (FIG. 12B). Deploying the third fin 1150c can alter the center of pressure of the vehicle during descent, and thereby change the stability and maneuverability of the vehicle during descent. Each fin housing 1153 can be co-located with a corresponding strut 1183 (FIG. 12C) so that the third fins 1150c are housed within the struts 1183 when stowed. This arrangement can reduce or eliminate any additional drag associated with the actuation mechanism for moving the third fins 1150c. The fin housing 1153 can further include an actuator 1154 that drives the third fin 1150c from a stowed position to one or more deployed positions. In a representative embodiment, the third fin 1150c can be deployed to any of three representative predefined positions identified as D1, D2, and D3. The third fin 1150c can be deployed to any intermediate position as well to provide finely-controlled directional control forces on the vehicle into which it is installed. In another embodiment, the third fin 1150c can be deployed to more positions or continuously between various fully-deployed and stowed positions. A similar arrangement can be used to differentially deploy the brakes 1140 (FIG. 12C), in addition to or in lieu of differentially deploying the third fins.

Figure 14:
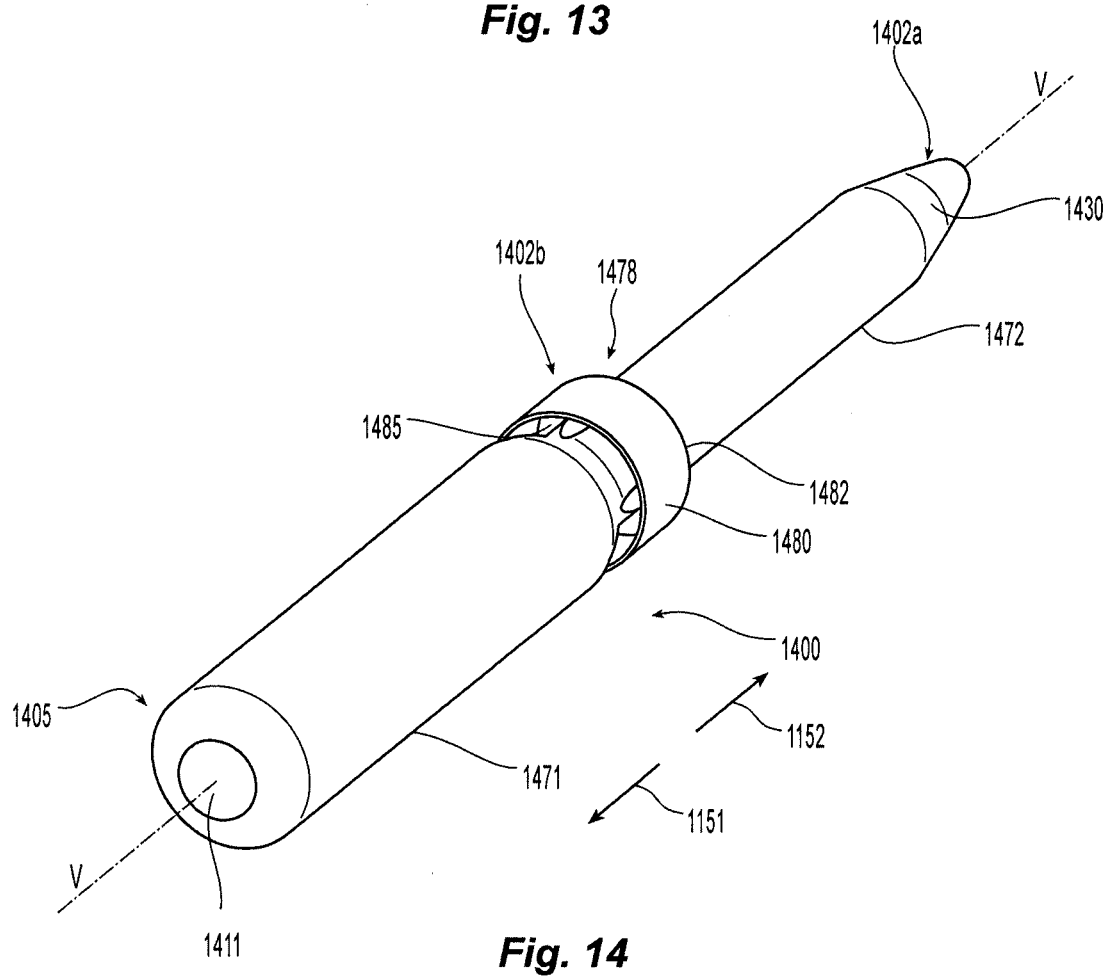
FIG. 14 is a partially schematic isometric illustration of a multi-stage vehicle having an annular element configured in accordance with another embodiment of the present technology.

FIG. 14 is a partially schematic, bottom isometric illustration of a vehicle 1400 having an annular element 1480 configured in accordance with still another embodiment of the present technology. The vehicle 1400 can include a first stage 1471 removably attached to a second stage 1472 at a predefined separation location 1478. The vehicle 1400 further includes one or more nozzles 1411 positioned toward a first end 1405 of the vehicle, and a payload module 1430 positioned toward a second end 1402b of the second stage 1472. The annular element 1480 is positioned between the axial extremities of the vehicle, at least when the first and second stages 1471, 1472 are joined. During ascent, the second end 1402a of the second stage 1472 forms the second end of the vehicle overall, and after the second stage 1472 has separated from the first stage 1471, the second end 1402b of the first stage 1471 forms the second end of a vehicle as the first stage 1471 descends. Accordingly, the annular element can have a first position relative to a first overall length of the vehicle when the first and second stages are connected, and a second position relative to a second overall length of the launch vehicle (e.g., just the first stage 1471), that is different than the first position when the first and second stages are separated, even though the annular element can have a single fixed position relative to the first stage 1471 whether the first stage is attached to or separated from the second stage 1472. Unlike the arrangement described above with reference to FIGS. 11-12C, the second stage 1472 can have a smaller diameter than that of the first stage 1471. Accordingly, a second edge surface 1482 of the annular element 1480 is exposed to external flow both during vehicle ascent and vehicle descent. During ascent, air flows through an airflow or through-flow gap 1485 between the annular element 1480 and the rest of the vehicle 1400 in the first direction 1151. During descent, the air flows in the opposite direction 1152 through the same gap 1485.

In particular embodiments, the first stage 1471 can have a blunt or flat portion at the second end 1402b. Further details of representative embodiments of this feature are described below with reference to FIGS. 15 and 16.

Figure 15:
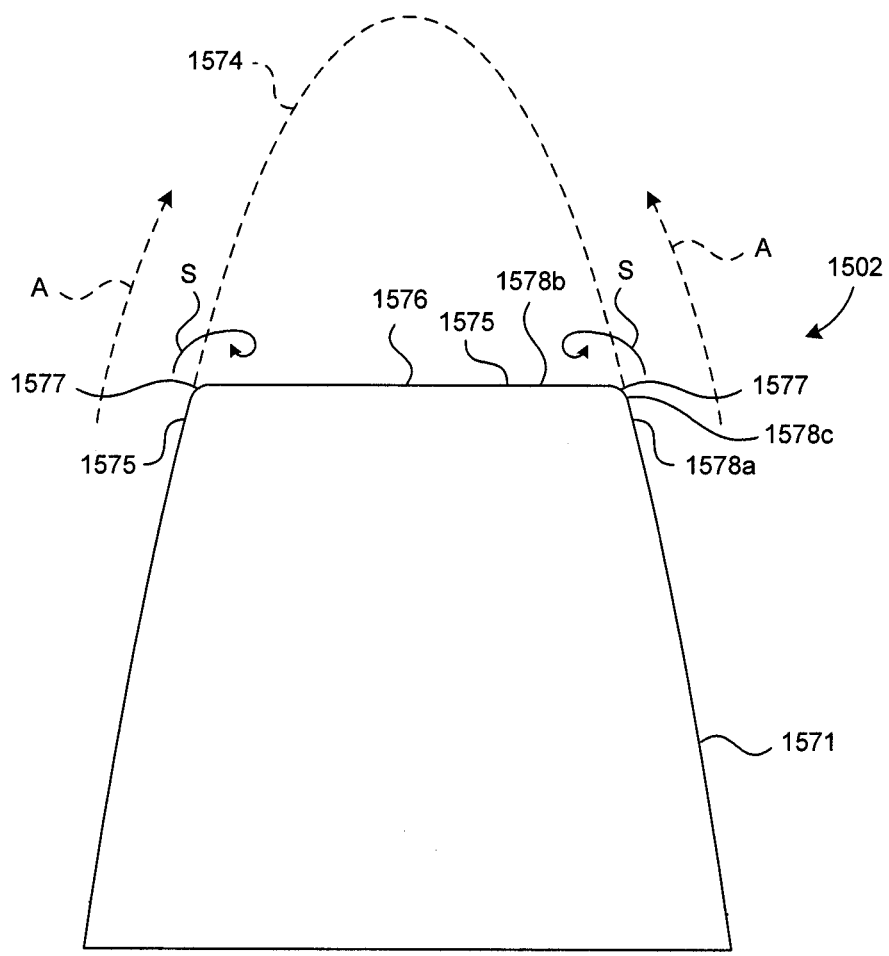
FIG. 15 is a partially schematic elevation view of the second end of a vehicle first stage having a flattened closeout surface in accordance with an embodiment of the present technology.

FIG. 15 is a partially schematic, side view of a portion of a vehicle first stage 1571 having a second end 1502 with a close-out surface 1575 configured in accordance with an embodiment of the present technology. Conventional vehicles of this type often include a conical close-out surface 1574, as indicated in dashed lines in FIG. 15. If such a conventional vehicle descends tail first, the air flow around the conical surface 1574 generally follows the flow paths indicated by arrows A. One potential drawback of such a surface is that, as the vehicle angle of attack changes during descent, the point at which the flows separate from the conical surface can change dramatically. This in turn can cause dramatically shifting and potentially destabilizing forces at the second end 1502 of the first stage 1571. Accordingly, an embodiment of the present technology includes a close-out surface 1575 having a flat or otherwise less curved portion 1576. In particular embodiments, the close-out surface 1575 includes a first circumferentially-extending portion 1578a that (in cross-section) has a contour that is flat or has a first curvature, a second circumferentially-extending portion 1578b positioned radially inwardly from the first circumferentially-extending portion and having a contour that is flat or has a second curvature, and a third circumferentially-extending portion 1578c positioned between the first and second circumferentially-extending portions 1578a, 15678b. The third circumferentially-extending surface 1578c can have a third curvature sharper (e.g. of a smaller radius) than the first curvature and sharper than the second curvature. Put another way, the third portion 1578c is more sharply curved than both the first and second portions 1578a, 1578b. As used herein, the phrase "more sharply curved" as a relative expression includes contours with any degree of curvature when compared to a flat contour.

In particular embodiments, the third circumferentially-extending surface 1578c forms a break or edge 1577. This break or edge 1577 (or other shape for the third circumferentially-extending surface 1578c) can extend circumferentially around the vehicle axis V and can provide a fixed, predictable location at which flow separates from the second end 1502. Such flow separation is indicated by arrows S. In addition, the drag resulting from this boat-tail portion of the first stage 1571 during a tail-down descent can further slow the first stage descent. As a result, other forces required to further slow the first stage 1571 (e.g., rocket forces) can be reduced.

Figure 16:
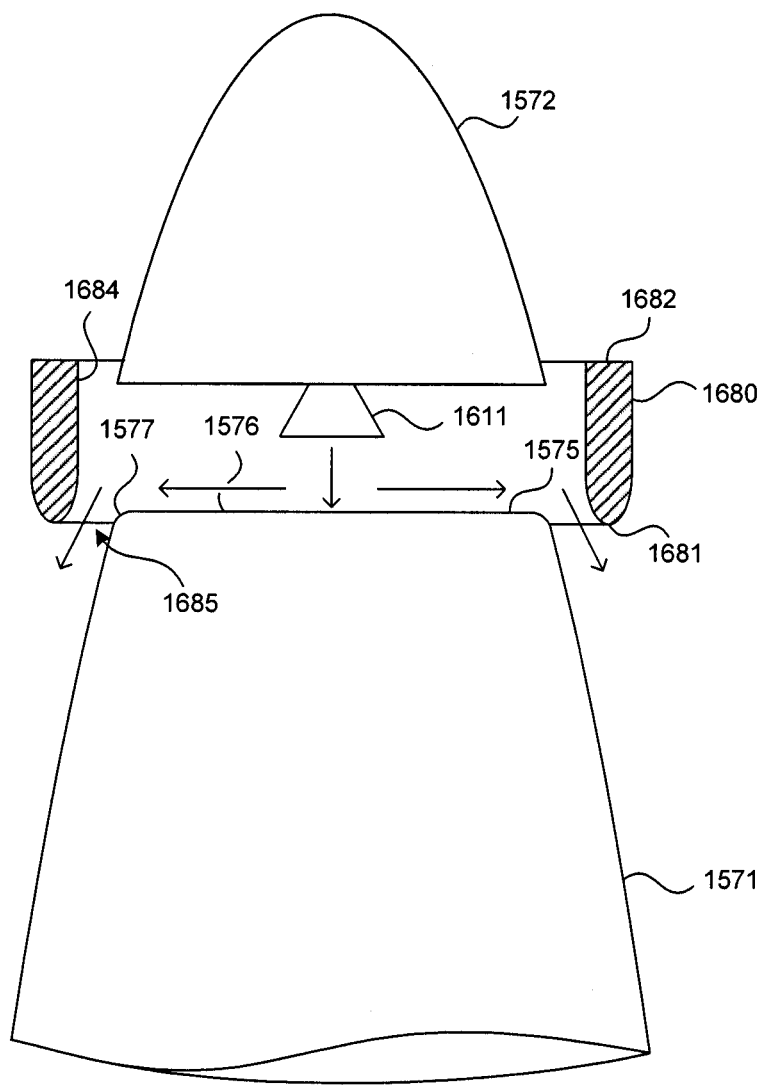
FIG. 16 is a partially schematic, side elevation view of an embodiment of the first stage shown in FIG. 15, with a second stage and annular element positioned in accordance with an embodiment of the present technology.

FIG. 16 shows an embodiment of the first stage 1571 described above with reference to FIG. 15, in combination with a second stage 1572 and an annular element 1680. In a particular aspect of this embodiment, the second stage 1572 includes a crew capsule, which in turn includes a second stage nozzle 1611 positioned to provide an emergency escape function for crew carried in the second stage 1572. In particular, the second stage nozzle 1611 can be activated in case of an emergency to direct the second stage 1572 away from the first stage 1571. The annular element 1680 can include an exposed, inwardly facing surface 1684, a sharp or curved first edge surface 1681, and a blunt or squared-off second edge surface 1682.

One feature of the flat portion 1576 of the close-out surface 1575 is that it can direct the exhaust gases from the second stage nozzle 1611 in such a way as to enhance rather than interfere with the ability of the second stage 1572 to depart from the first stage 1571. In particular, if the close-out surface 1575 were to have a conical shape (as indicated by the conical surface 1574 described above with reference to FIG. 15), the flow exiting the second stage nozzle 1611 can accelerate through a gap 1685 (e.g., an airflow or flow-through gap) between the annular element 1680 and the first stage 1571, causing the second stage 1572 to be drawn toward, rather than forced away from, the first stage 1571. The flat portion 1576 (or other portion that is not as highly curved as the conical surface 1574 shown in FIG. 15) can direct the flow and/or provide a greater axial reaction force on the first stage 1571 so as to more expediently direct the first and second stages 1571, 1572 away from each other.

The foregoing arrangements shown in FIGS. 11-14C and 16 is that the second stage, in combination with the annular element, can provide further system advantages that may result from the arrangement of the second stage and the annular element. For example, at least some conventional interfaces between the first and second stage of a rocket include an upwardly open, "can" shaped region at the top of the first stage into which the second stage nozzle fits. Because this region is unvented, when the second stage rocket motor starts, it can cause very high pressures within the region, and/or very high forces on the second stage. To avoid this result, conventional designs typically include a spring system or other actuator that pushes the first and second stages apart before the second stage motor is started. The separation is also typically conducted outside the Earth's atmosphere to avoid atmospheric effects. Unlike these conventional arrangements, embodiments of the annular element described above can provide a vented region into which the second stage nozzle fits, as shown in FIG. 16. As a result, the system does not require a spring or other actuator to separate the stages prior to starting the second stage motor, which reduces system weight. In addition, the annular element can both increase the overall pressure forcing the two stages apart (e.g., because the flat portion 1576 receives a greater axial thrust than would a cone), while lowering the peak force (via venting). Lowering the peak force in turn reduces the impact on astronauts and/or cargo carried by the second stage.

The foregoing arrangement can also widen the window during which separation occurs. In particular, this arrangement can enhance the predictability of rocket-thrust induced separation, which can allow for separation at lower altitudes, including within the Earth's atmosphere, thereby reducing or minimizing potential airflow uncertainties. Instead, the system components can produce repeatable behavior, even in varying atmospheric conditions. In particular, the fluid dynamic effects of this arrangement appear to scale in a more predictable manner (making small scale tests more accurate), and are more predictable in full scale operation. Accordingly, this arrangement can be particularly suitable for a crew escape maneuver (which may occur within the atmosphere) but without the need for a tractor-type escape tower, such as was used for the Apollo system. Such escape towers must be jettisoned on a normal flight, which can introduce a flight safety risk, and such towers are not re-usable.

From the foregoing, it will be appreciated that specific embodiments of the disclosed technology have been described herein for purposes of illustration, but that the technology may include other embodiments as well. For example, the deployable surfaces 140 can have petals 141 with shapes and/or arrangements that are different than those shown and described above. In another example, further features of the fuel tank can be integrated with the launch vehicle. For example, at least part of the external surface of the launch vehicle can be formed by an external surface of the fuel tank. The annular element can be shaped as a complete ring encircling the launch vehicle, or in other embodiments, one or more annular elements can extend around only a portion or portions of the vehicle. In particular embodiments, the annular element is fixed relative to the vehicle (e.g., fixed relative to the first stage of the vehicle), and in other embodiments it can move relative to the portion of the vehicle from which it depends. For example, the annular element can slide axially among multiple positions. The third fins 1150c were described in particular embodiments as deployable. In other embodiments, the third fins 1150c can be fixed, e.g., fixed relative to the annular element 1180. The close-out surface can have a central portion with flat shape, or another shape that provides a significantly flatter profile over the central portion of the close-out surface, and/or has a higher degree of curvature at the break than either inwardly or outwardly from the break. The annular elements described above with reference to FIGS. 11-16 can be combined with the flare surfaces described above with reference to FIGS. 1A-6B, and/or the fuel tanks and associated vehicle shapes described above with reference to FIGS. 7-10.

Certain aspects of the disclosure described in the context of particular embodiments may be combined or eliminated in other embodiments. For example, the tapered fuel tank described above with reference to FIGS. 9 and 10 can be combined with any of the disclosed tapered external vehicle surfaces, and/or the tapered external surfaces can be combined with any of the deployable deceleration surfaces described above. Further, while advantages associated with certain embodiments have been described in the context of those embodiments, other embodiments may also exhibit such advantages and not all embodiments need necessarily exhibit such advantages to fall within the scope of the present disclosure. Accordingly, the disclosure can encompass other embodiments not expressly shown or described herein.

We claim:

1. An aerospace system, comprising:
a launch vehicle having a first end and a second end generally opposite the first end, the launch vehicle being elongated along a vehicle axis extending between the first end and the second end and having an external, outwardly facing surface;
an annular element fixedly attached to the launch vehicle, the annular element having an external, inwardly facing surface radially spaced apart from, and extending at least partially circumferentially around, the vehicle axis, the annular element having a first edge surface facing a first direction along the vehicle axis and a second edge surface facing a second direction along the vehicle axis, the second direction being opposite the first direction;

a propulsion system directly attached to the launch vehicle and having at least one nozzle positioned toward the first end of the launch vehicle to launch the launch vehicle; and a controller in communication with the launch vehicle and programmed with instructions that, when executed, direct the launch vehicle in the first direction during vehicle ascent, and direct the launch vehicle in the second direction during vehicle descent.

2. The system of claim 1 wherein the inwardly facing external surface is radially spaced apart from and extends at least partially around the external, outwardly facing surface of the launch vehicle.

3. The system of claim 1 wherein the annular element carries a fixed fin.

4. The system of claim 1 wherein the annular element includes at least one deployable element, and wherein the controller is programmed with instructions that, when executed, move the at least one deployable element from a stowed position to a deployed position for vehicle descent.

5. The system of claim 4 wherein the at least one deployable element includes a fin.

6. The system of claim 5 wherein the fin has a surface aligned generally parallel with the vehicle axis.

7. The system of claim 4 wherein the at least one deployable element includes a brake.

8. The system of claim 7 wherein the brake has a surface positioned transverse to the vehicle axis in the deployed configuration.

9. The system of claim 4 wherein the deployed position of the at least one deployable element is one of multiple deployed positions for the at least one deployable element.

10. The system of claim 1 wherein the launch vehicle includes:
a first stage positioned along the vehicle axis; and
a second stage positioned along the vehicle axis and joined to the first stage at a predefined separation location, the second stage being separable from the first stage at the separation location during flight; and wherein
the annular element is positioned proximate to the separation location.

11. The system of claim 1 wherein the controller is carried by the launch vehicle.

12. The system of claim 1 wherein the first and second edge surfaces are exposed to external flow around the launch vehicle.

13. The system of claim 1 wherein the first edge surface is shielded from external flow during vehicle ascent, and is exposed to external flow during vehicle descent.

14. The system of claim 1 wherein the second edge surface is positioned closer to the first end of the vehicle than is the first edge surface, and wherein the first edge surface is blunter than the second edge surface.

15. The system of claim 1 wherein the external, inwardly facing surface of the annular element is positioned radially further away from the vehicle axis than is the external radially outwardly facing surface of the launch vehicle.

16. The system of claim 1 wherein the second end of the vehicle includes a close-out have a curvature break that forms a circumferentially extending edge around the vehicle axis.

17. An aerospace system, comprising:
a launch vehicle having a first end and a second end generally opposite the first end, the launch vehicle being elongated along a vehicle axis extending between the first end and the second end and having an external, outwardly facing surface;
an annular element fixedly attached to the launch vehicle, the annular element having an external, inwardly facing surface radially spaced apart from, and extending circumferentially around, at least a portion of the external surface at a location along the vehicle axis between the first end and the second end, the annular element having a first edge surface facing a first direction along the vehicle axis and a second edge surface facing a second direction along the vehicle axis, the second direction being opposite the first direction;
a propulsion system directly attached to the launch vehicle and having at least one nozzle positioned toward the first end of vehicle to launch the launch vehicle; and
a controller in communication with the launch vehicle and configured to direct the launch vehicle in the first direction during vehicle ascent, and direct the launch vehicle in the second direction during vehicle descent.

18. The system of claim 17 wherein the annular element is spaced apart, along the vehicle axis, from the furthest axial extremity of the second end and the furthest axial extremity of the first end.

19. The system of claim 17 wherein the launch vehicle includes:
a first stage positioned along the vehicle axis; and
a second stage positioned along the vehicle axis and joined to the first stage at a predefined separation location, the second stage being separable at the separation location from the first stage during flight; and wherein
the annular element has a first position relative to a first overall length of the launch vehicle when the first and second stages are joined, and a second position relative to a second overall length of the launch vehicle when the second stage is separated from the first stage.

20. The system of claim 17, further comprising a controller in communication with the launch vehicle and configured to direct the vehicle in the first direction during vehicle ascent, and direct the vehicle in the second direction during vehicle descent.

21. An aerospace system, comprising:
a launch vehicle having a first end and a second end generally opposite the first end, the launch vehicle being elongated along a vehicle axis extending between the first end and the second end and having an external, outwardly facing surface, the launch vehicle including:
a first stage positioned along the vehicle axis; and
a second stage positioned along the vehicle axis and joined to the first stage at a predefined separation location, the second stage being separable at the separation location from the first stage during flight;
an annular element fixedly attached to the launch vehicle, the annular element having an external, inwardly facing surface and being radially spaced apart from, and extending at least partially circumferentially around the vehicle axis, the annular element having a first position relative to a first overall length of the launch vehicle when the first and second stages are joined, and a second position relative to a second overall length of the launch vehicle when the second stage is separated from the first stage;

a propulsion system directly attached to the launch vehicle and having at least one nozzle positioned toward the first end of the launch vehicle to launch the launch vehicle; and a controller in communication with the launch vehicle and programmed with instructions that, when executed, direct the launch vehicle in a first direction during vehicle ascent, and direct the launch vehicle in a second direction opposite the first direction during vehicle descent.

22. The system of claim 21 wherein the annular element has a single fixed position relative to the first stage both when the first and second stages are joined and when the first and second stages are separated.

23. The system of claim 21 wherein the second stage includes a crew compartment.

24. The system of claim 21 wherein the second stage includes a payload compartment.

25. The system of claim 21 wherein the first stage includes a close-out surface opposite the nozzle, the close-out surface having an exposed, circumferentially extending outwardly facing edge positioned radially outwardly from the vehicle axis.

26. The system of claim 21 wherein the annular element is carried by the first stage.

27. The system of claim 21, further comprising a controller in communication with the launch vehicle and programmed with instructions that, when executed, direct the vehicle in a first direction during vehicle ascent, and direct the vehicle in a second direction opposite the first direction during vehicle descent.

28. An aerospace system, comprising:
a launch vehicle having a first end and a second end generally opposite the first end, the launch vehicle being elongated along a vehicle axis extending between the first end and the second end and having an external, outwardly facing surface;
a propulsion system directly attached to the launch vehicle and having at least one nozzle positioned toward the first end of vehicle to launch the launch vehicle;
an annular element fixedly attached to the launch vehicle, the annular element having an external, inwardly facing surface radially spaced apart from, and extending circumferentially around, at least a portion of the vehicle axis, the annular element having a first edge surface facing a first direction along the vehicle axis and toward the first end of the vehicle, and a second edge surface facing a second direction along the vehicle axis and toward the second end of the vehicle, wherein the second edge surface is blunter than the first edge surface; and
a controller in communication with the launch vehicle and programmed with instructions that, when executed, direct the launch vehicle in a first direction during vehicle ascent, and direct the launch vehicle in a second direction opposite the first direction during vehicle descent.

29. The system of claim 28 wherein the annular element forms a ring around the vehicle axis.

30. The system of claim 28 wherein the annular element forms a ring around the external, outwardly facing surface of the launch vehicle.

31. The vehicle of claim 28 wherein the second edge surface is generally flat and the first edge surface is generally curved.

32. The vehicle of claim 28 wherein the annular element is positioned at a location along the vehicle axis between the first end and the second end.

33. The vehicle of claim 28 wherein the vehicle includes:
a first stage positioned along the vehicle axis; and
a second stage positioned along the vehicle axis and joined to the first stage at a predefined separation location, the second stage being separable at the separation location from the first stage during flight, and wherein the annular element is carried by the first stage and positioned proximate to the separation location.

34. The system of claim 33 wherein the first stage includes a close-out surface positioned proximate to the separation location, the close-out surface having:
a first circumferentially-extending portion;
a second circumferentially-extending portion positioned radially inwardly from the first circumferentially-extending portion; and
a third circumferentially-extending portion positioned between the first and second circumferentially-extending portions and being more sharply curved than the first and second circumferentially-extending portions.

35. The system of claim 28 wherein the second circumferentially-extending portion in generally flat in a plane transverse to the vehicle axis.

36. An aerospace system, comprising:
a launch vehicle having a first end and a second end generally opposite the first end, the launch vehicle being elongated along a vehicle axis extending between the first end and the second end and having an external, outwardly facing surface, the launch vehicle including:
a first stage positioned along the vehicle axis; and
a second stage positioned along the vehicle axis and joined to the first stage at a predefined separation location, the second stage being separable at the separation location from the first stage during flight;
an annular element fixedly attached to the launch vehicle, the annular element having an external, inwardly facing surface and being radially spaced apart from, and extending at least partially circumferentially around the vehicle axis, the annular element and the launch vehicle defining at least in part a flow-through gap between the external, outwardly facing surface of the launch vehicle and the external, inwardly facing surface of the annular element;
a propulsion system directly attached to the launch vehicle and having at least one nozzle positioned toward the first end of the launch vehicle to launch the launch vehicle; and
a controller in communication with the launch vehicle and programmed with instructions that, when executed, direct the launch vehicle in a first direction during vehicle ascent, and direct the launch vehicle in a second direction opposite the first direction during vehicle descent.

37. The system of claim 36 wherein the annular element is carried by the first stage.

38. The system of claim 36 wherein the at least one nozzle includes a first nozzle carried by the first stage and a second nozzle carried by the second stage, and wherein the second nozzle is positioned to direct exhaust products into and through the flow-through gap.

39. The system of claim 38 wherein the first stage includes a close-out surface positioned along the vehicle axis proximate to the second nozzle, the close-out surface having:

a first circumferentially-extending portion;

a second circumferentially-extending portion positioned radially inwardly from the first circumferentially-extending portion; and a third circumferentially-extending portion positioned between the first and second circumferentially-extending portions and being more sharply curved than the first and second circumferentially-extending portions.

40. The system of claim 39 wherein the third circumferentially-extending portion defines at least in part an outwardly facing edge positioned radially outwardly from the vehicle axis.

41. The system of claim 36 wherein the launch vehicle does not include a mechanical actuator positioned to push at least one of the first and second stages away from the other.

42. The system of claim 36, further comprising radially extending struts connecting the annular element to the first stage.

43. An aerospace system, comprising:

a launch vehicle having a first end and a second end generally opposite the first end, the launch vehicle being elongated along a vehicle axis extending between the first end and the second end and having an external, outwardly facing surface;

an annular element carried by the launch vehicle, the annular element having an external, inwardly facing surface radially spaced apart from, and extending at least partially circumferentially around, the vehicle axis, the annular element having a first edge surface facing a first direction along the vehicle axis and a second edge surface facing a second direction along the vehicle axis, the second direction being opposite the first direction, wherein the first edge surface is shielded from external flow during vehicle ascent, and is exposed to external flow during vehicle descent;

a propulsion system carried by the launch vehicle and having at least one nozzle positioned toward the first end of the launch vehicle to launch the launch vehicle; and a controller in communication with the launch vehicle and programmed with instructions that, when executed, direct the launch vehicle in the first direction during vehicle ascent, and direct the launch vehicle in the second direction during vehicle descent.

* * * * *